US012422024B2

(12) United States Patent
Bonham et al.

(10) Patent No.: US 12,422,024 B2
(45) Date of Patent: Sep. 23, 2025

(54) CONTINUOUSLY VARIABLE TRANSMISSION CLUTCH WITH MOVABLE SHEAVE ACTUATOR

(71) Applicant: TEAM Industries, Inc., Bagley, MN (US)

(72) Inventors: Brandon R. Bonham, Bemidji, MN (US); Brian George Eck, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/744,178

(22) Filed: Jun. 14, 2024

(65) Prior Publication Data

US 2024/0418246 A1     Dec. 19, 2024

Related U.S. Application Data

(60) Provisional application No. 63/508,738, filed on Jun. 16, 2023.

(51) Int. Cl.
*F16H 9/12* (2006.01)
*F16H 9/14* (2006.01)
(Continued)

(52) U.S. Cl.
CPC ............ *F16H 9/125* (2013.01); *F16H 9/14* (2013.01); *F16H 61/30* (2013.01); *F16H 61/66227* (2013.01)

(58) Field of Classification Search
CPC .......... F16H 55/563; F16H 9/14; F16H 9/125; F16H 63/067; F16H 63/065; F16H 61/30;
(Continued)

(56) References Cited

U.S. PATENT DOCUMENTS 2,999,574 A * 9/1961 Dodge .............. F16H 61/66245
74/336.5
3,017,783 A * 1/1962 Van Der Brugghen ....................
F16H 61/66263
474/14

(Continued)

FOREIGN PATENT DOCUMENTS

| EP | 2116743 B1 | 3/2013 |
| EP | 3099961 B1 | 8/2020 |
| EP | 2901043 B1 | 9/2020 |

OTHER PUBLICATIONS

International Searching Authority, "International Search Report and Written Opinion", dated Oct. 8, 2024, from PCT Application No. PCT/US2024/034130, from Foreign Counterpart to U.S. Appl. No. 18/744,178, pp. 1 through 18, Published: WO.

*Primary Examiner* — Henry Y Liu
(74) *Attorney, Agent, or Firm* — Fogg & Powers LLC

(57) ABSTRACT

A continuously variable transmission (CVT) clutch is provided that includes a CVT gearing control assembly that is configured to move a movable sheave of the CVT clutch axially on a post independent of movement caused by a reactive assembly of the CVT clutch. A slave cylinder housing of the CVT gearing control assembly forms an oil chamber that includes a plurality of slave push piston cylinders. A slave push piston is received in each slave push piston cylinder in the slave cylinder housing. Each slave push piston is in operational communication with an engaging member that is configured to selectively engage and move the movable sheave. An actuator assembly adjusts pressure to selectively move the slave push pistons.

20 Claims, 16 Drawing Sheets

(51) Int. Cl.
*F16H 61/30* (2006.01)
*F16H 61/662* (2006.01)

(58) Field of Classification Search
CPC ............. F16H 61/662; F16H 61/66227; F16H 63/3023; F16H 9/18
USPC .......................................... 474/13, 14, 18, 28
See application file for complete search history.

(56) References Cited

U.S. PATENT DOCUMENTS

| | | | | |
|---|---|---|---|---|
| 3,052,132 A * | 9/1962 | Karig | F16H 61/662 | 474/18 |
| 3,362,242 A * | 1/1968 | Watkins | F16H 61/66245 | 474/46 |
| 3,653,283 A * | 4/1972 | Betz | F16H 61/66263 | 474/18 |
| 3,698,256 A * | 10/1972 | Albertson | F16H 55/563 | 474/14 |
| 3,709,052 A * | 1/1973 | Lassanske | F16H 55/563 | 192/114 R |
| 3,771,378 A * | 11/1973 | Knobel | F16H 61/66245 | 474/14 |
| 3,939,720 A * | 2/1976 | Aaen | F16H 55/563 | 474/46 |
| 5,173,084 A * | 12/1992 | Lemieux | F16H 63/065 | 474/8 |
| 5,399,123 A * | 3/1995 | Blackburn | F16H 55/563 | 474/18 |
| 5,879,253 A * | 3/1999 | Friedmann | F16H 59/14 | 474/18 |
| 5,890,991 A * | 4/1999 | Sakakiyama | F16H 61/66259 | 701/52 |
| 6,086,492 A * | 7/2000 | Nakano | F16H 55/563 | 477/44 |
| 6,149,540 A * | 11/2000 | Johnson | F16H 61/66227 | 474/46 |
| 6,309,317 B1 * | 10/2001 | Joss | F16D 43/06 | 474/14 |
| 6,565,465 B2 * | 5/2003 | Nishigaya | F16H 63/065 | 474/18 |
| 6,962,543 B2 * | 11/2005 | Roby | F16H 63/067 | 474/37 |
| 7,063,633 B2 * | 6/2006 | Robert | F16H 61/66245 | 474/19 |
| 7,207,920 B2 * | 4/2007 | Jonsson | F16H 63/062 | 477/44 |
| 7,771,300 B2 * | 8/2010 | Starkey | F16H 63/062 | 474/14 |
| 7,951,026 B2 * | 5/2011 | Soga | F16H 61/0206 | 474/28 |
| 8,409,039 B2 * | 4/2013 | Beyer | F16H 55/563 | 474/14 |
| 8,414,433 B2 * | 4/2013 | Kadokawa | F16H 9/18 | 474/18 |
| 8,527,166 B2 * | 9/2013 | Tamura | F16H 61/66259 | 701/55 |
| 8,645,035 B2 * | 2/2014 | Rioux | F16H 61/66272 | 701/61 |
| 8,682,549 B2 * | 3/2014 | Roberge | F16H 55/56 | 474/11 |
| 8,892,316 B2 * | 11/2014 | Eguchi | B60W 50/082 | 701/55 |
| 9,228,644 B2 * | 1/2016 | Tsukamoto | F16H 9/18 | |
| 9,267,580 B2 * | 2/2016 | Aitcin | F16H 63/067 | |
| 9,394,992 B2 * | 7/2016 | Fujimura | F16H 61/66259 | |
| 9,429,235 B2 * | 8/2016 | Krosschell | B60G 17/015 | |
| 9,476,486 B2 * | 10/2016 | Hochmayr | F16H 61/6624 | |
| 9,500,264 B2 * | 11/2016 | Aitcin | B62M 27/02 | |
| 9,644,717 B2 * | 5/2017 | Aitcin | F16H 63/067 | |
| 9,759,313 B2 * | 9/2017 | Nelson | F16H 61/0204 | |
| 10,054,211 B2 * | 8/2018 | Zulawski | F16H 55/56 | |
| 10,670,144 B2 * | 6/2020 | Roland | F16H 59/54 | |
| 10,711,888 B2 * | 7/2020 | Tardif-Leblanc | F16H 61/662 | |
| 10,711,889 B2 * | 7/2020 | Roland | B60W 10/06 | |
| 10,865,860 B2 * | 12/2020 | Mariotti | F16H 9/18 | |
| 11,105,408 B2 * | 8/2021 | Nesti | F16H 9/125 | |
| 11,143,285 B2 * | 10/2021 | Eck | B60W 10/02 | |
| 11,261,963 B2 * | 3/2022 | Roland | F16H 59/62 | |
| 11,794,843 B2 * | 10/2023 | Roland | B60W 50/082 | |
| 2002/0072441 A1 * | 6/2002 | Inoue | F16H 61/66259 | 474/18 |
| 2002/0119846 A1 * | 8/2002 | Kitai | F16H 63/062 | 474/14 |
| 2002/0155909 A1 * | 10/2002 | Roby | F16H 55/56 | 474/46 |
| 2003/0221890 A1 * | 12/2003 | Fecteau | F16H 55/56 | 180/210 |
| 2006/0264279 A1 * | 11/2006 | Starkey | F16H 63/062 | 474/18 |
| 2012/0179344 A1 * | 7/2012 | Rioux | F16H 61/66259 | 701/61 |
| 2014/0315670 A1 * | 10/2014 | Mariotti | F16H 55/563 | 474/12 |
| 2017/0082193 A1 * | 3/2017 | David | F16H 61/0213 | |
| 2018/0195606 A1 * | 7/2018 | Roland | B60W 10/06 | |
| 2018/0195607 A1 * | 7/2018 | Roland | F16H 61/66272 | |
| 2018/0355966 A1 * | 12/2018 | Mariotti | F16H 9/18 | |
| 2019/0285150 A1 * | 9/2019 | Zurbruegg | F16D 23/12 | |
| 2020/0292073 A1 * | 9/2020 | Roland | F16H 59/54 | |
| 2021/0215248 A1 * | 7/2021 | Matsuo | F16H 61/12 | |
| 2022/0153378 A1 * | 5/2022 | Roland | F16H 59/54 | |
| 2022/0243810 A1 * | 8/2022 | Truskolaski | F16H 63/062 | |

* cited by examiner

CONTINUOUSLY VARIABLE TRANSMISSION CLUTCH WITH MOVABLE SHEAVE ACTUATOR

CROSS-REFERENCE TO RELATED APPLICATIONS

This application claims priority to U.S. Provisional Application Ser. No. 63/508,738, same title herewith, filed on Jun. 16, 2023, which is incorporated in its entirety herein by reference.

BACKGROUND

The use of continuously variable transmissions (CVTs) in vehicles provides advantages over traditional transmission due to infinite gearing ratios that the CVT provides. A CVT typically includes a primary clutch and a secondary clutch. The primary clutch may also be referred to as a primary pulley, a drive clutch, or a drive sheave. The secondary clutch may also be referred to as a secondary pulley, a driven clutch, or driven sheave. The primary clutch is typically in operational communication with an engine to receive engine torque and the secondary clutch is in operational communication with a driveline of an associated vehicle. The secondary clutch is in rotational communication with the primary clutch via endless loop member such as a belt. Both the primary clutch and secondary clutch may include a movable sheave that is configured move axially on a post and a fixed sheave that is axially fixed at a position on the post. The movable sheave axially moves on the post either away from or towards the fixed sheave based on revolutions per minute (RPM) or applied torque the associated CVT clutch is experiencing. An example of an RPM sensitive arrangement is a flyweight/spider arrangement, and an example of a torque sensitive arrangement is a cam/roller arrangement. The belt, riding on faces of the fixed and movable sheave assemblies move radially either towards a central axis of the primary clutch or away from the central axis therein changing the gear ratio of the CVT. Under certain conditions the normal operating characteristics of the CVT may not be desired.

For the reasons stated above and for other reasons stated below which will become apparent to those skilled in the art upon reading and understanding the present specification, there is a need in the art for a CVT with drive modes that modify the normal operating conditions (i.e., gear ratio) of the CVT.

SUMMARY

The following summary is made by way of example and not by way of limitation. It is merely provided to aid the reader in understanding some of the aspects of the subject matter described. Embodiments provide a CVT clutch with an actuator that overrides, augments, or supplements the normal operating characteristics of the CVT clutch.

In one embodiment, a CVT clutch is provided. The CVT clutch includes a post, a fixed sheave, a movable sheave, a reactive assembly and a CVT gearing control assembly. The fixed sheave is mounted on a first end of the post in an axially fixed configuration. The movable sheave mounted on the post. The movable sheave is configured to selectively move axially on the post. The reactive assembly is configured to move the movable sheave based on at least one of RPMs the CVT clutch is experiencing and torque the CVT clutch is experiencing. The CVT gearing control assembly is configured to move the movable sheave axially on the post independent of movement caused by the reactive assembly. The CVT gearing control assembly includes an engaging member, a slave cylinder housing, at least one oil line, slave push pistons, and an actuator assembly. The slave cylinder housing forms an oil chamber that includes a plurality of slave push piston cylinders. The at least one oil line is in fluid communication with the oil chamber. A slave push piston is received in each slave push piston cylinder of the plurality of slave push piston cylinders in the slave cylinder housing. Each slave push piston is in operational communication with the engaging member. The actuator assembly includes an actuator that is configured to adjust pressure in the at least one oil line to selectively move the movable sheave axially on the post independent of movement caused by the reactive assembly.

In another embodiment, another CVT clutch is provided. The CVT clutch includes a post, a fixed sheave, a movable sheave, a reactive member, a CVT gearing control assembly, and an actuator assembly. The fixed sheave is mounted on a first end of the post in an axially fixed configuration. The movable sheave is mounted on the post. The movable sheave is configured to selectively move axially on the post. The reactive assembly is configured to move the movable sheave based on at least one of RPMs the CVT clutch is experiencing and torque the CVT clutch is experiencing. The CVT gearing control assembly is configured to move the movable sheave axially on the post independent of movement caused by the reactive assembly. The CVT gearing control assembly includes an engaging member, a slave cylinder housing, at least one oil line, slave push pistons, return bolts, pull biasing members, and an actuator assembly. The slave cylinder housing forms an oil chamber that includes a plurality of slave push piston cylinders and a plurality of pull cylinders. The at least one oil line is in fluid communication with the oil chamber. A slave push piston is received in each slave push piston cylinder of the plurality of pull cylinders in the slave cylinder housing. Each slave push piston is in operational communication with the engaging member. A return bolt received in each pull cylinder of the slave cylinder housing. Each return bolt includes a first end having a head and a second end coupled to the engaging member. A pull biasing member is used for each return bolt. Each pull biasing member is configured to bias an associated return bolt into an associated pull cylinder. The actuator assembly includes an actuator that is configured to adjust pressure in the at least one oil line to selectively move the movable sheave axially on the post independent of a movement caused by the reactive assembly.

In yet another embodiment, a vehicle is provided. The vehicle includes a motor, a CVT, at least one sensor, at least one controller, at least one memory and a driveline. The motor is used to generate torque. The CVT including a drive clutch and driven clutch in torsional communication with each other through an endless looped member, the drive clutch in torsional communication with the motor, the drive clutch including, a post, a fixed sheave, a movable sheave, a reactive assembly, a CVT gearing control assembly. The fixed sheave is mounted on a first end of the post in an axially fixed configuration. The movable sheave is mounted on the post. The movable sheave is configured to selectively move axially on the post. The reactive assembly is configured to move the movable sheave based on at least one of a RPMs the drive clutch is experiencing and torque the drive clutch is experiencing. The CVT gearing control assembly is configured to move the movable sheave axially on the post independent of movement caused by the reactive assembly.

The CVT gearing control assembly includes an engaging member, a slave cylinder housing, at least one oil line, a slave push piston, and an actuator assembly. The slave cylinder housing forms an oil chamber that includes a plurality of slave push piston cylinders. The at least one oil line is in fluid communication with the oil chamber. A slave push piston received in each slave push piston cylinder of the plurality of slave push piston cylinders in the slave cylinder housing. Each slave push piston is in operational communication with the engaging member. The actuator assembly includes an actuator that is configured to adjust pressure in the at least one oil line to selectively move the movable sheave axially on the post independent of a movement caused by the reactive assembly. The at least one sensor is configured to generate sensor signals. The memory is configured to store operating instructions. The controller is configured to control the actuator of the actuator assembly based at least in part on the operating instructions and the sensor signals from the at least one sensor. The driveline is in torsional communication with the driven clutch.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a continuously variable transmission (CVT) clutch with an actuator that overrides, augments, or supplements the normal operating characteristics of the CVT clutch. In one example, the normal operating characteristics are provided by a reactive assembly which may be a revolutions per minute (RPM) sensitive assembly or a torque sensitive assembly. An example of an RPM sensitive assembly is a flyweight/spider assembly, and an example of a torque sensitive assembly is a cam/roller assembly. Example embodiments are shown herein as implementing an RPM sensitive assembly. Other examples may include a torque sensitive assembly. As discussed above, there are some instances where a desired gearing cannot be achieved with just a normal RPM or torque sensitive assembly controlling the respective movable sheave of the CVT clutch. In that case, an actuator may be used to override, augment, or supplement the normal RPM or torque sensitive assemblies.

Figure 1:
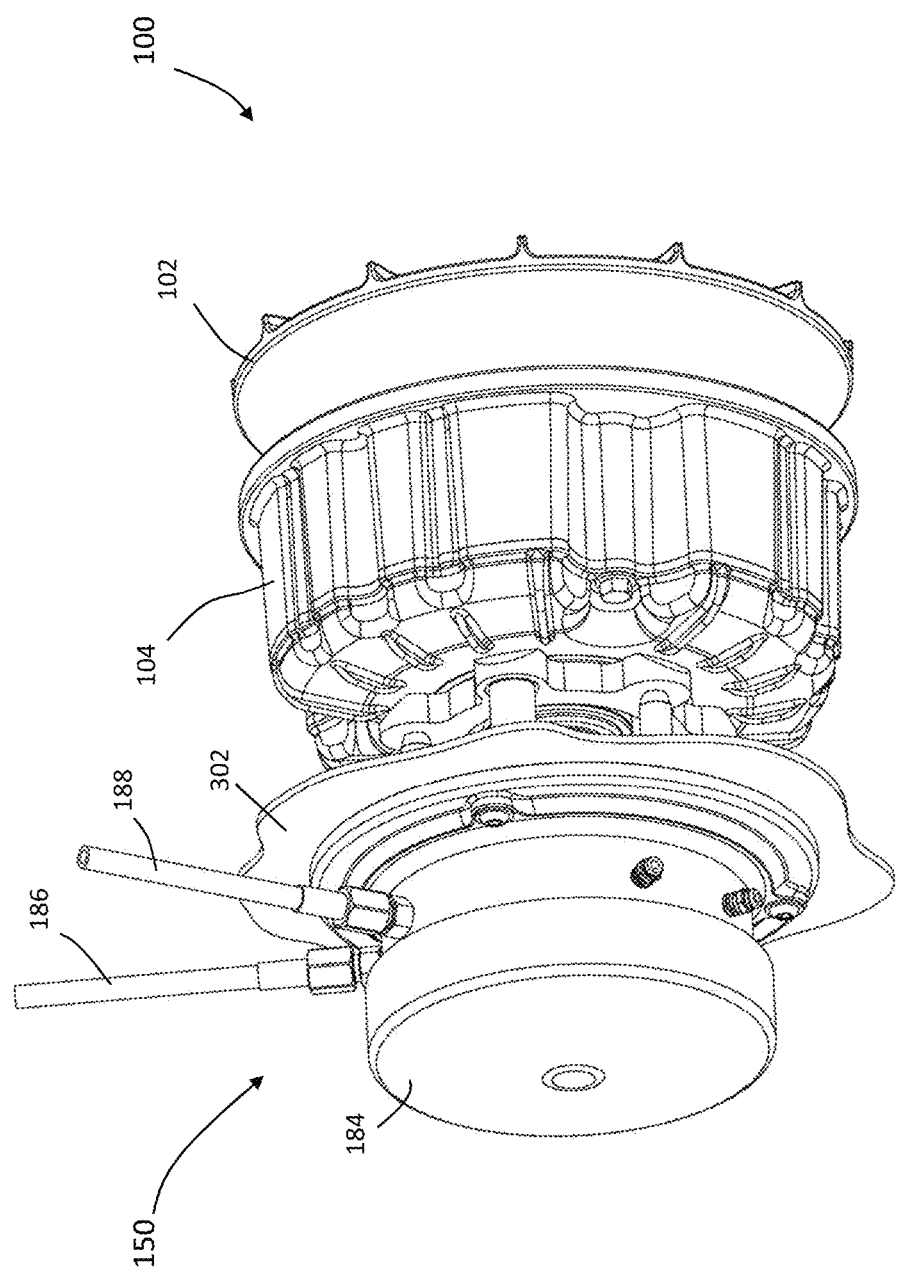
FIG. 1 is an assembled side perspective of a CVT clutch that includes a CVT gearing control assembly according to one exemplary embodiment.

FIG. 1 is a CVT clutch 100 of a CVT that includes a CVT gearing control assembly 150 according to one example. The CVT clutch 100 may be a primary clutch or drive clutch in an example. In another example it may be a secondary clutch or driven clutch. The CVT clutch includes a fixed sheave 102 and a movable sheave 104.

Figure 2:
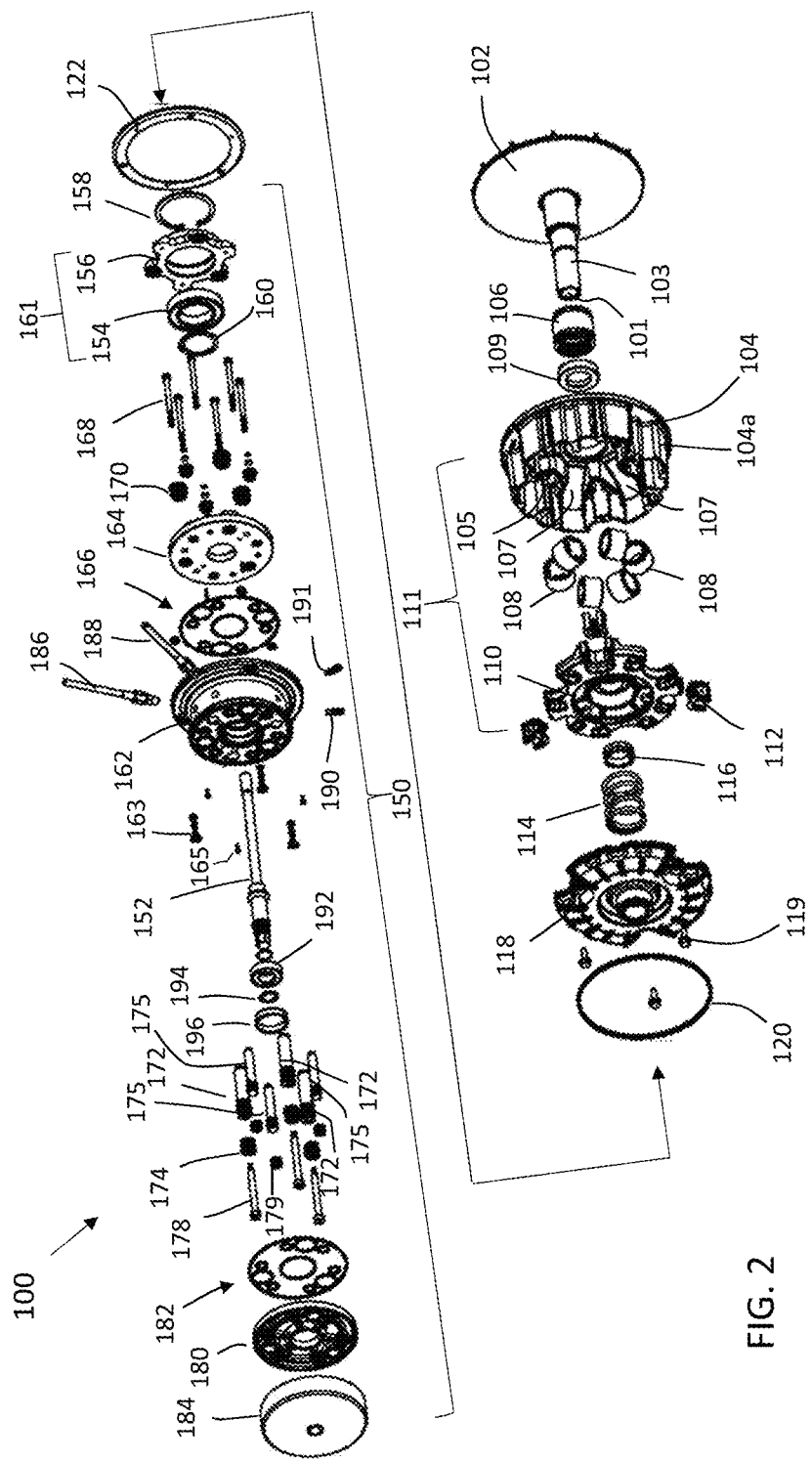
FIG. 2 is an unassembled side perspective view of the CVT clutch and the CVT gearing gear control assembly of FIG. 1.
Figure 3:
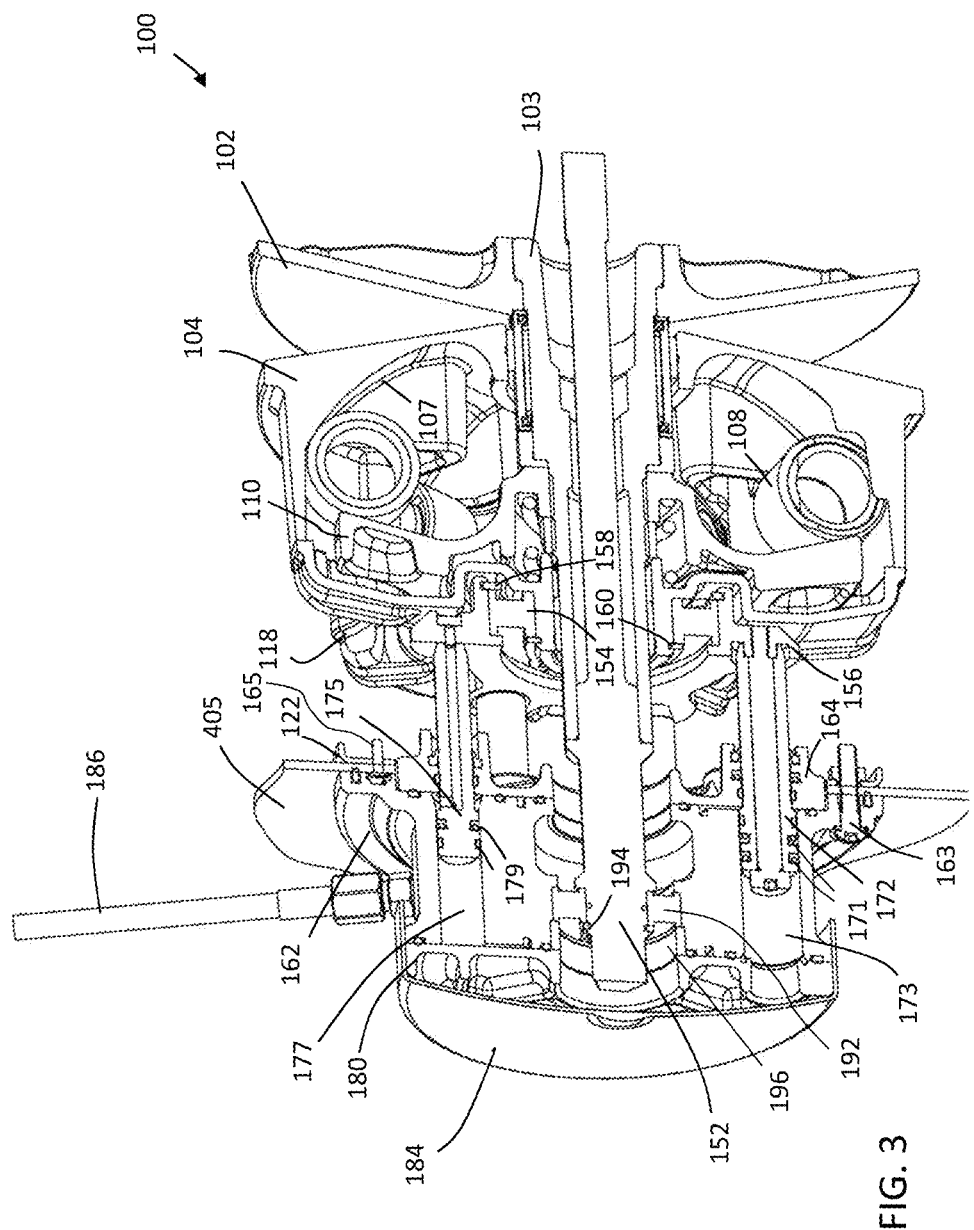
FIG. 3 is a cross-sectional side perspective view of the CVT clutch and CVT gearing control assembly of FIG. 1 illustrating the use of the gear control assembly to move a movable sheave towards a fixed sheave of the CVT clutch.

FIG. 2 illustrates an unassembled view of the CVT clutch 100 of FIG. 1 and FIG. 3 illustrates a cross-sectional side perspective view of the CVT clutch 100 of FIG. 1. The fixed sheave 102 is mounted on a first end of the post 103. And idler bearing 106 is mounted on the post 103 and is position between the fixed sheave 102 and the movable sheave 104. An idler bearing cap 109 engages the idler bearing 106 in this example.

The movable sheave 104 includes a hub portion 104a that forms an inner chamber 105. Within the inner chamber 105 is a reactive assembly 111 that is designed to axially move the movable sheave 104 based on at least one of rpm and torque the CVT clutch 100 is experiencing. The reactive assembly 111 in this example includes a plurality of ramps 107, a spider 110 and a plurality of centrifugal pucks 108 or rollers. Ramps 107 are attached within the inner chamber 105 of the hub portion 104a of the movable sheave 104. In another embodiment the ramps 107 are formed in the inner chamber 105. Movable sheave 104 is slidably mounted on the post 103. The movable sheave 104 selectively moves axially on the post 103 towards and away from the fixed sheave 102 to position a belt at a desired distance from a central axis of the CVT clutch 100 to achieve a desired gearing.

Centrifugal pucks 108 (which may be rollers in an example) are positioned to engage the ramps 107 within hub portion 104a of the movable sheave 104. In one example the centrifugal pucks 108 or rollers are designed to slide or roll along the ramps 107 due to centrifugal forces experienced by the CVT clutch 100. Spider 110, having torque buttons 112, also engages the centrifugal pucks 108 or rollers in this example. The spider 110 is statically mounted on post 103. In one example, a jam nut 116 is used to axially retain the spider 110 on the post 103. The movable sheave 104 is biased away from the fixed sheave 102 by a clutch bias member 114 which is in this example a spring. Clutch bias member 114 is positioned between a movable sheave cover 118 and the spider 110. The movable sheave cover 118 is coupled to an end of the hub portion 104a of the movable sheave 104 via fasteners 119 which in this example are screws. In the example of FIG. 2, a clutch enclosure gasket 120 and clutch enclosure flange 122 may be used. The movable sheave cover 118 and the hub portion 104a of the movable sheave 104 form the inner chamber 105 in which the spider 110 and centrifugal pucks 108 or rollers are received.

The CVT gearing control assembly 150 includes an extended clutch bolt 152 that includes a first portion that is received within a central bore 101 of the post 103. An inner bearing 154 and an inner bearing housing 156 are mounted on the cover 118 and retained on the cover 118 and inner bearing housing 156 via retaining clips 158 and 160. The inner bearing 154 and inner bearing housing 156 are part of an engaging member 161 that engages the movable sheave cover 118 of the movable sheave 104.

The CVT gearing control assembly 150 further includes a slave cylinder housing 162 that is coupled to an outer CVT enclosure 405 (best illustrated in FIG. 3), via fasteners 163. An inner fastener mounting ring 122 is coupled to the outer CVT enclosure 405 via fasteners 165 or rivets and the slave cylinder housing 162 via fasteners 163 in an example. The outer CVT enclosure 405 could be made to accept fasteners 163 directly as well, eliminating the need for inner fastener mounting ring 122. Inner cover seals 166 are used to seal the inner slave cylinder cover 164 and passages through the inner cover 164 to an oil chamber formed by the slave cylinder housing 162 and the inner slave cylinder cover 164. Further illustrated are slave cylinder bolts 168 and inner cover seals 170. The slave cylinder housing 162 is positioned around a second portion of the extended clutch bolt 152.

Also included in the CVT gearing control assembly 150 is a plurality of slave pull pistons 172 that are positioned within associated pull cylinders 173 within an oil chamber formed by the slave cylinder housing 162. Oil seals 171 are positioned in grooves of the slave pull pistons 172. Further, a plurality of slave push pistons 175 are positioned within associated slave push piston cylinders 177 within the oil chamber formed by the slave cylinder housing 162 as best illustrated in FIG. 3. The slave pull pistons 172 act to selectively pull open the clutch sheaves (i.e., act to move to pull the movable sheave 104 away from the fixed sheave. The slave push pistons 175 selectively act to close the clutch sheaves (i.e., act to move the movable sheave 104 towards the fixed sheave 102). Hydraulic pressure in the pull cylinders 173 and slave push piston cylinders 177 is provided on select sides of the respective slave pull pistons 172 and slave push pistons 175 to move the respective slave pull pistons 172 and slave push pistons 175 in respective directions to achieve the desired directional movement of the movable sheave 104.

Pull piston seals 174 are used to seal each slave pull piston 172 within an associated pull cylinder 173 and push piston seals 179 are used to seal each slave push piston 175 within an associated slave push piston cylinder 177. A return bolt 178 for each slave pull piston 172 passes through a central passage of an associated slave pull piston 172 and is coupled to an inner bearing housing 156 in this example. In one example, each return bolt 178 is threadably coupled to the inner bearing housing 156.

The arrangement of the slave pull pistons 172 of the slave cylinder assembly, which includes the slave pull pistons 172, slave push pistons 175, slave cylinder housing, etc., coupled with the use of return bolts 178 allow for the removal the slave cylinder assembly from the movable sheave 104 of the CVT clutch 100. In particular, removal of the return bolts 178, fasteners 163 and retaining clip 194 in this example, allows for the removal of the slave assembly from the movable sheave 104 (and CVT clutch 100) without a need to break into any of the hydraulic fluid passages of the master/slave pump system of the CVT clutch 100. This provides an in-field serviceable CVT clutch and belt system.

An outer slave cylinder cover 180 is coupled to the slave cylinder housing 162. A plurality of outer cover seals 182 are used to seal the outer slave cylinder cover 180 to the slave cylinder housing 162. A flexible dust cover 184 is designed to cover the outer slave cylinder cover 180 to protect from external contamination and allow for air volume changes underneath cover 180 with associated movement of pull pistons 172. Oil lines 186 and 188 provide a fluid passage into and out of the slave cylinder housing 162. Oil bleed screws 190 and 191 may be used to bleed air out of the slave cylinder housing 162. Further illustrated are an outer bearing 192, a retaining clip 194 to axially hold the outer bearing 192 on the extended clutch bolt 152, and a bearing collar 196.

The use of the extended clutch bolt 152 allows forces generated by the slave cylinder assembly, that are applied to the movable sheave portion of the CVT clutch 100, to be reacted upon entirely within the CVT clutch 100. This ensures, in a drive clutch example of the CVT clutch 100, that these generated forces are not communicated to a crankshaft of an engine (such as motor 302 of FIG. 11). Any forces generated by either the CVT clutch 100 or the hydraulic system (that includes the slave cylinder assembly) are self-contained in this example.

The hydraulic circuit formed with the master/slave pump system in the actuator assembly 200 (discussed below) and the CVT gearing control assembly 150 is a closed loop circuit in one example. In one example, the dual acting actuator can supply a "push" and "pull" force to the dual acting master cylinder piston 222 to simultaneously supply/remove hydraulic fluid for either the slave pull pistons 172 and the slave push pistons 175.

The cross-sectional side view of 3 illustrates the CVT clutch 100 in a configuration where the movable sheave 104 is positioned near the fixed sheave 102. As illustrated, the slave pull pistons 172 and slave push pistons 175 in this configuration are at least partially positioned out of their respective cylinders. This positioning may occur because of either pressure in the slave push cylinders 177 supplementing the forces created by the reactive assembly 111, by forces created by the reactive assembly 111 itself, or a combination of both.

Figure 4:
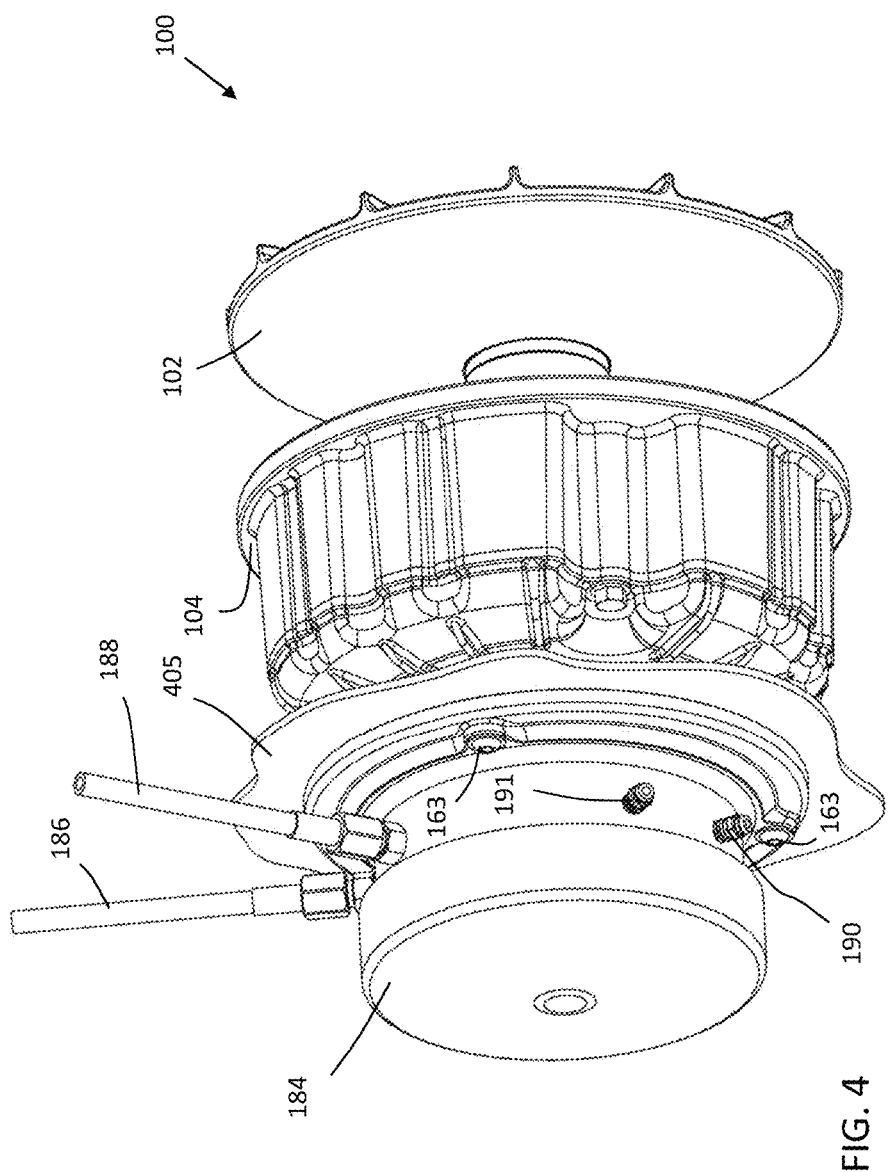
FIG. 4 is assembled side perspective view of the CVT clutch and gear control assembly of FIG. 1 illustrating the movable sheave being positioned away from the fixed sheave.
Figure 5:
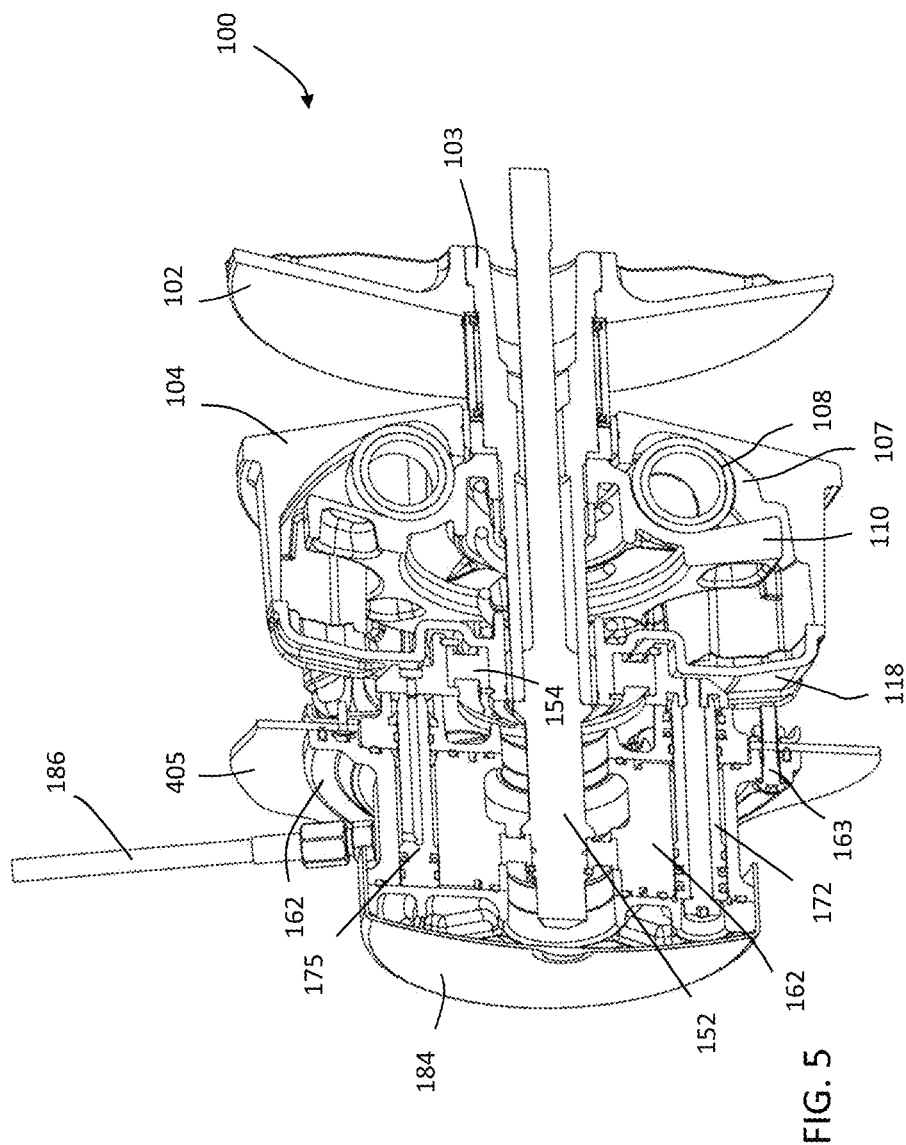
FIG. 5 is a cross-sectional side perspective view of the CVT clutch and gear control assembly of FIG. 1 illustrating the movable sheave being positioned away from the fixed sheave.

FIG. 4 illustrates an assembled view of the CVT clutch 100 in the configuration where the movable sheave 104 is positioned away from the fixed sheave 102. FIG. 5 illustrates a cross-sectional view of the CVT clutch 100 in the configuration where the movable sheave 104 is positioned away from the fixed sheave 102. As illustrated in FIG. 1, the slave pull pistons 172 and slave push pistons 175 in this configuration are received all the way within their respective slave cylinders 173 and 177. This positioning may occur because of hydraulic pressure in the respective pull cylinders 173, lack of forces created by the reactive assembly 111 itself (i.e., a bias force of the clutch bias member 114 controls the positioning of the movable sheave 104 in relation to the fixed sheave 102), or a combination of both.

Figure 6:
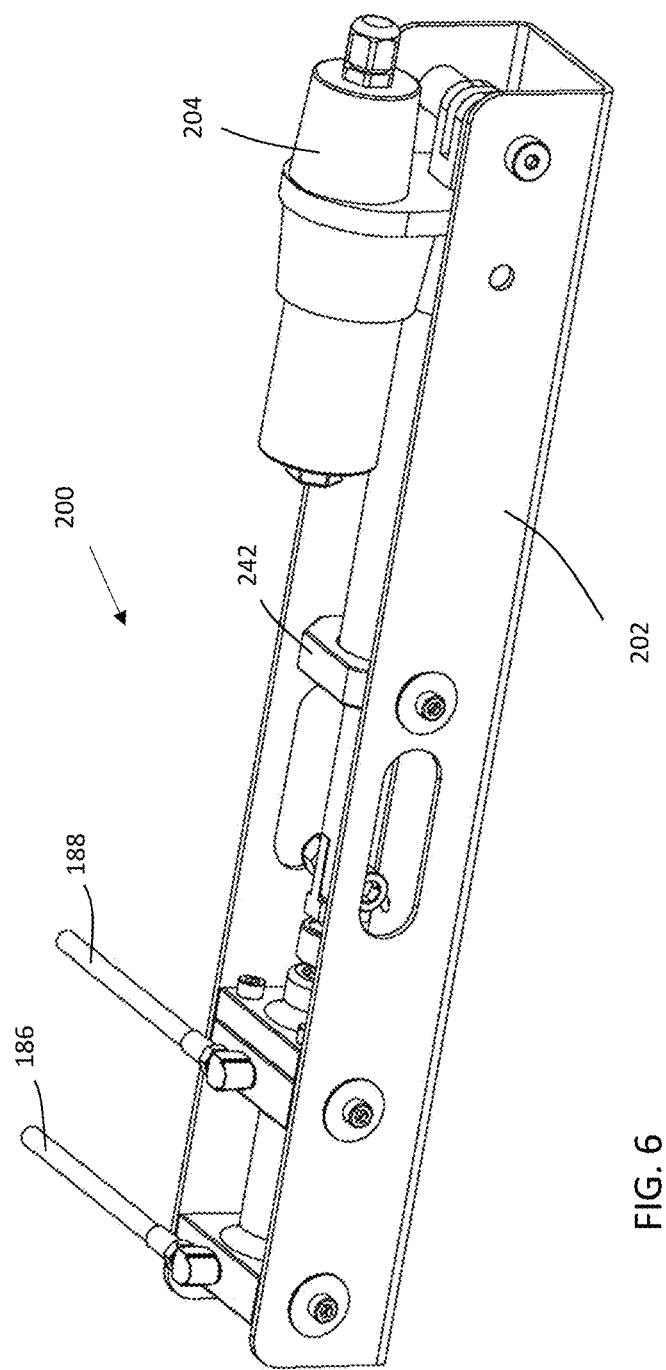
FIG. 6 is an assembled side perspective view of an actuation assembly according to one exemplary embodiment used to control the gearing control assembly.

An example of an actuator assembly 200 that selectively provides hydraulic pressure to control the CVT gearing control assembly 150 of the CVT clutch 100 is illustrated in the assembled side perspective view of actuator assembly 200 of FIG. 6. An unassembled side perspective view of the actuator assembly 200 is further illustrated in FIG. 7 and as is discussed below in detail.

The actuator assembly 200 includes an actuator bracket 202. Mounted in actuator bracket 202 is actuator 204. The actuator 204 in this example is mounted to the actuator bracket 202 with an actuator bolt 206, spacers 208a and 208b and an actuator nut 210.

Also mounted in actuator bracket 202 is a master cylinder housing 212. The master cylinder housing 212 is mounted to the actuator bracket 202 via screws 214 and washers 216. Oil line 186 is connected to a first end of the master cylinder housing 212 via oil line fitting 218 and oil line 188 is connected to a second end of the master cylinder housing 212 via oil line fitting 220.

Figure 7:
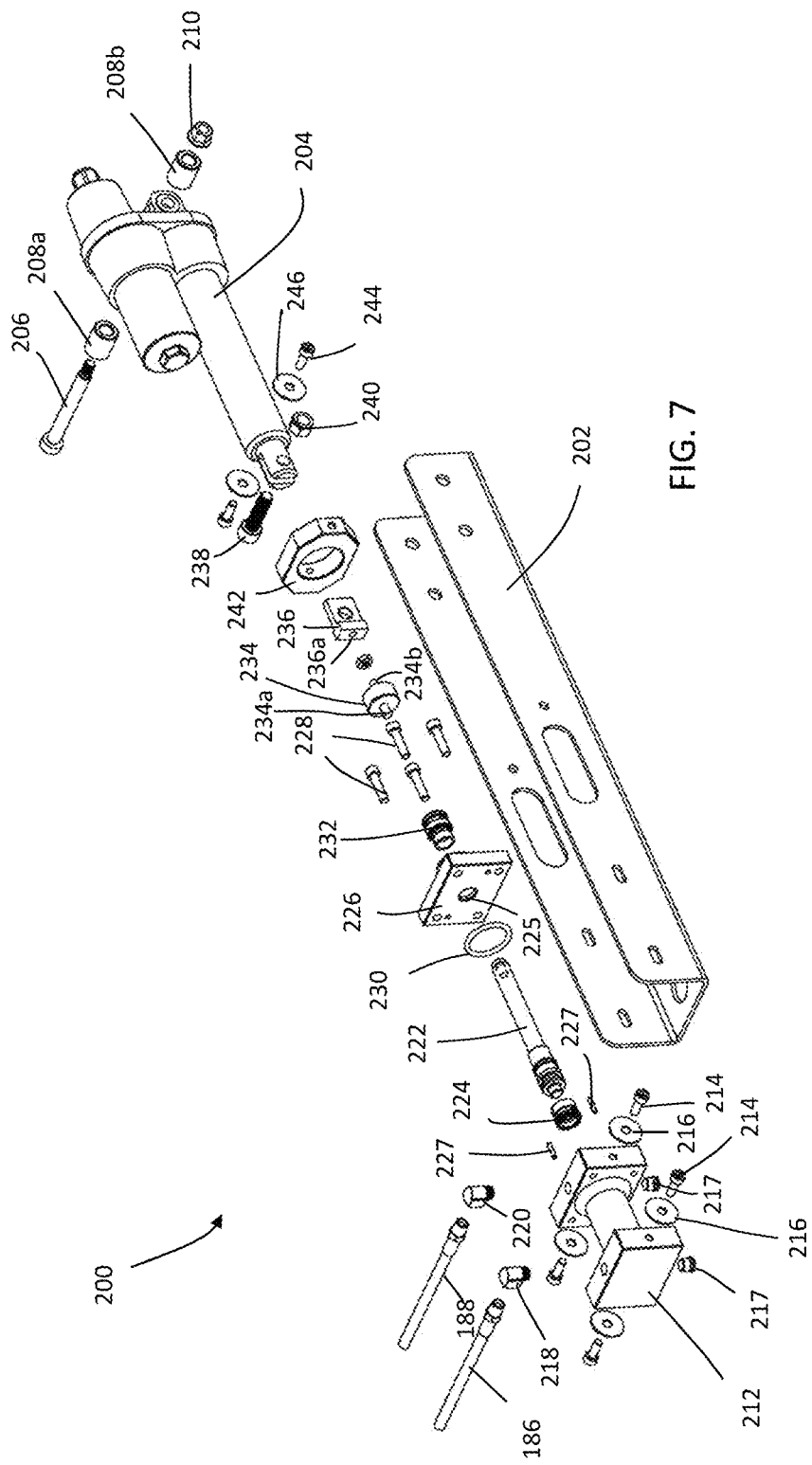
FIG. 7 is an unassembled side perspective view of the actuation assembly of FIG. 6.
Figure 8:
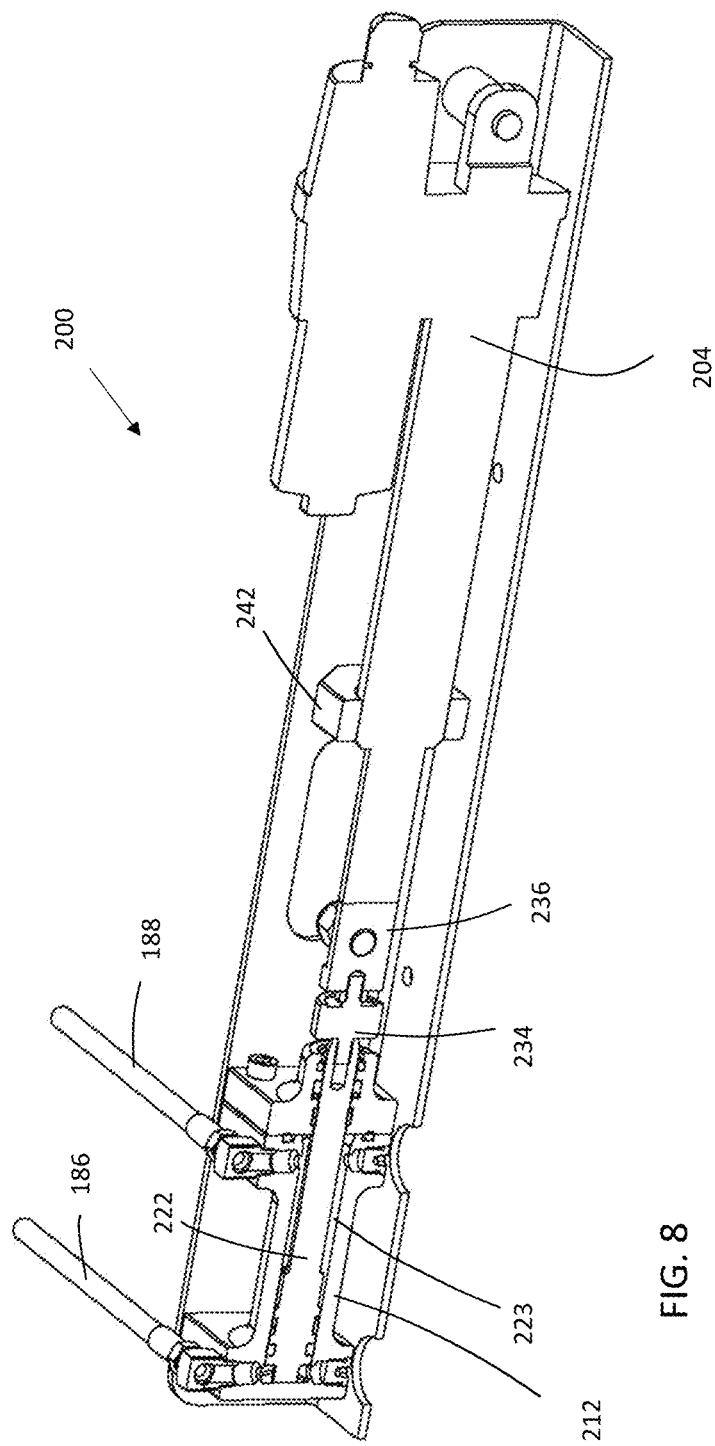
FIG. 8 is a cross-sectional side perspective view of the actuation assembly of FIG. 6 in an activation configuration.

An actuator piston 222 is received within a piston sleeve 223 within the master cylinder housing 212 as best illustrated in the cross-sectional side view of FIG. 8. Piston seals 224 provide a seal for the actuator piston 222 within the piston sleeve 223. Master cylinder cover 226, that is lined up with the second end of the master cylinder housing 212 via alignment pins 227, is coupled to the master cylinder housing 212 via master cylinder fasteners 228. A cover seal 230 is used to seal the master cylinder cover 226 to the master cylinder housing 212. Further master cylinder cover seals 232 provide seals between a portion of the actuator piston 222 that passes through a piston passage 225 in the master cylinder cover 226. Also illustrated in FIG. 7 is oil fill plugs 217.

An end of the actuator piston 222 receives a first center extending portion 234a of a load cell 234. A second center extending portion 234b of the load cell 234 extends from a second opposite side of the load cell 234 and is received within a bore 236a of a load cell adapter 236. The load cell adapter 236 is further coupled to the actuator 204 via actuator rod screw 238 and actuator rod nut 240. An actuator collar 242 is coupled to actuator bracket 202 via a pair of actuator collar screws 244 and actuator collar washers 246 to support the actuator 204.

FIGS. 6 and 8 illustrate the actuator assembly 200 in a first configuration where the actuator piston 222 is pushed forward in the piston sleeve 223 in the master cylinder housing 212 to pressurize fluid through oil line 186. This action positions the movable sheave 104 a selected distance from the fixed sheave 102.

Figure 9:
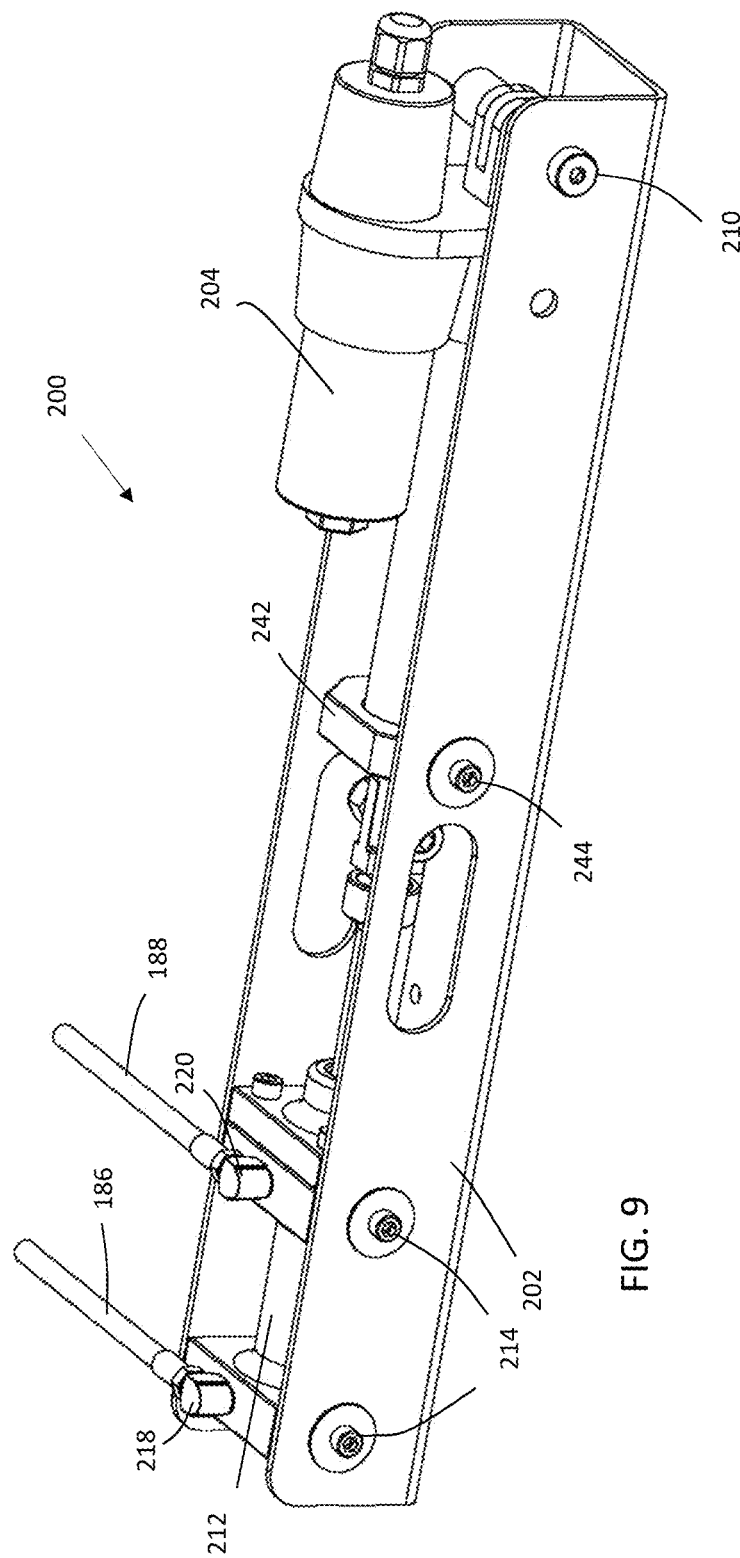
FIG. 9 is a side perspective view of the actuation assembly of FIG. 6 in an non-activation configuration.
Figure 10:
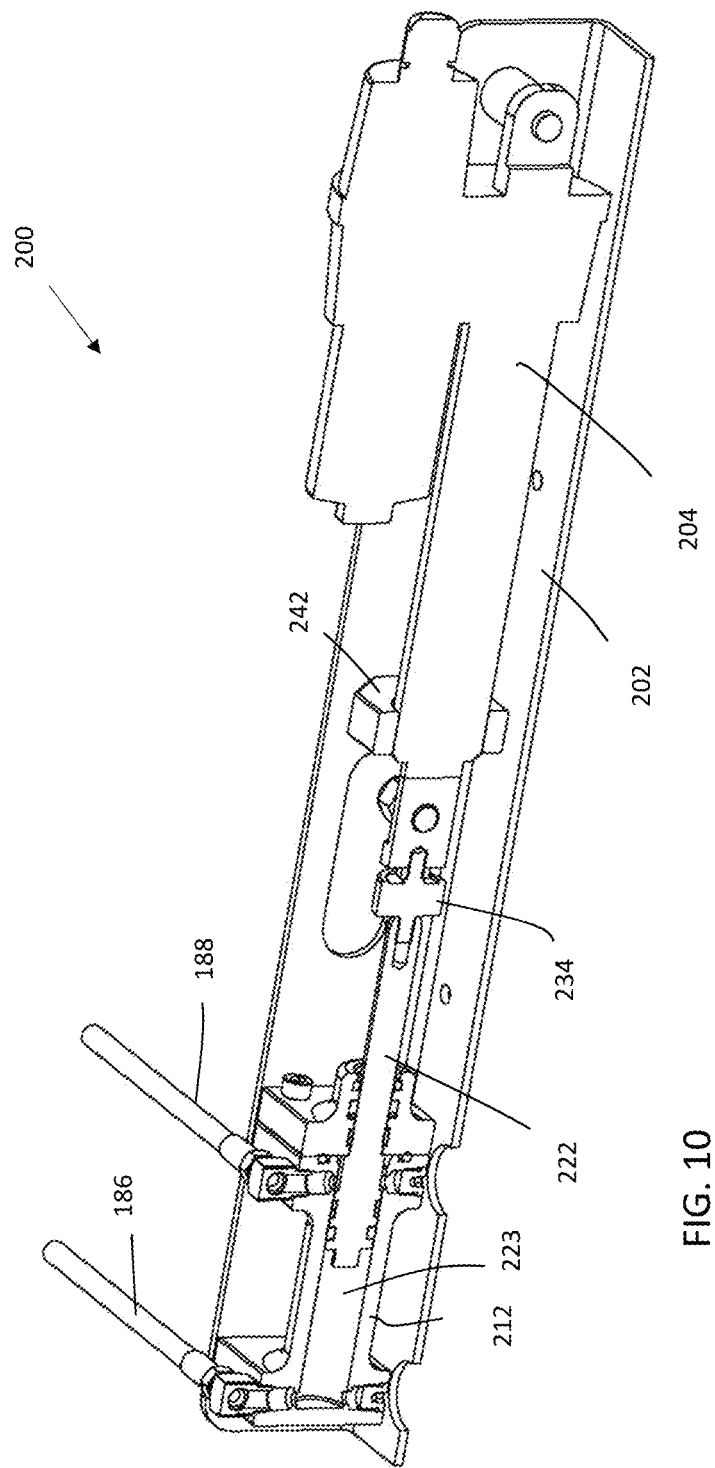
FIG. 10 is a cross-sectional side perspective view of the actuation assembly of FIG. 6 in the non-activation configuration.

The assembled view of the actuator assembly 200 illustrated in FIG. 9 and the cross-sectional view of FIG. 10 illustrate a second configuration where the actuator piston 222 is pulled back by the actuator 204 (pressure actuator) in the piston sleeve 223 in the master cylinder housing 212 to reduce pressure in oil line 186. This action, with reduced pressure from the actuator assembly 200, allows the CVT clutch 100 to change gears with the aid of or even without aid from the reactive assembly 111.

Figure 11:
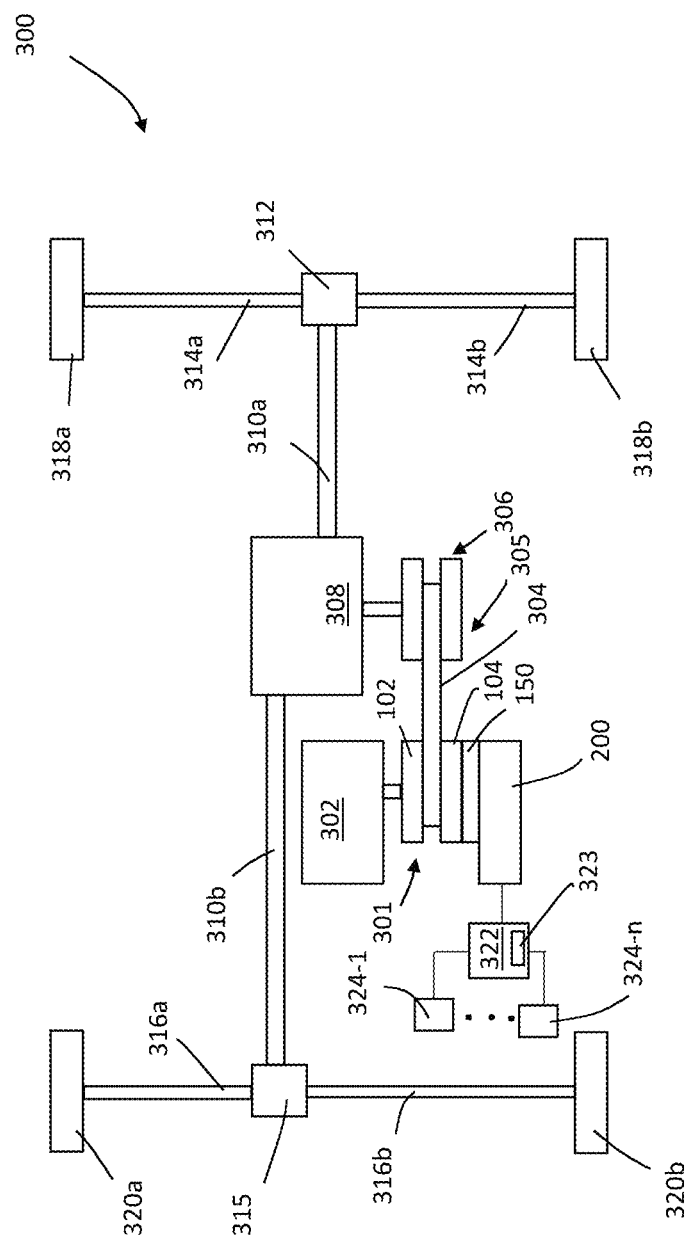
FIG. 11 is a block diagram of a vehicle implementing a CVT clutch and gear control assembly according to one exemplary embodiment.

FIG. 11 illustrates a vehicle 300 of an example that includes with a CVT clutch with a CVT gearing control assembly 150 and an actuator assembly. Although, the CVT gearing control assembly 150 is part of a drive clutch 301 in this example, in another example the driven clutch 306 may include a CVT gearing control assembly that is controlled by an actuator and further in another example both the drive clutch and the driven clutch include a CVT gearing control assembly that is controlled by an actuator.

Vehicle 300 of FIG. 11 includes motor 302 that provides torque, such as engine torque that is communicated to the primary clutch of drive clutch 301, such as CVT clutch 100 described above and CVT clutch 400 described below. Motor 302 may be an internal combustion engine, an electrical motor, or any other type of engine that provides torque. A CVT 305 that includes the drive clutch 301, also includes a secondary clutch or driven clutch 306 and an endless looped member 304 that communicates torque (provides torsional communication) between the drive clutch 301 and the driven clutch 306. The driven clutch 306 is further in communication with a driveline that includes transmission 308 or gear box in this example.

The driveline, in this example further includes a rear prop shaft 310a that is operationally coupled to a rear differential 312. The rear differential 312 is operationally coupled to rear wheels 318a and 318b via respective half shafts 314a and 314b in this example. The driveline, in this example also includes a front prop shaft 310b that is operationally coupled to a front differential 315. The front differential 315 is operationally coupled to front wheels 320a and 320b via respective half shafts 316a and 316b in this example.

Actuator 204 of the actuator assembly 200, is controlled by a controller 322 that implements operating instructions stored in a memory 323. In general, the controller 322 may include any one or more of a processor, microprocessor, a digital signal processor (DSP), an application specific integrated circuit (ASIC), a field program gated array (FPGA), or equivalent discrete or integrated logic circuitry. In some example embodiments, a controller 322 may include multiple components, such as any combination of one or more microprocessors, one or more controllers, one or more DSPs, one or more ASICs, one or more FPGAs, as well as other discrete or integrated logic circuitry. The functions attributed to the controller 322 herein may be embodied as software, firmware, hardware or any combination thereof. The controller 322 may be part of a system controller or a component controller such as, but not limited to an engine control module, a vehicle controller, transmission controller, etc. Memory 323 may include computer-readable operating instructions that, when executed by the controller 322 provides functions of shifting the CVT 305 to modify normal operating characteristics of the CVT 305. Such functions may include the functions of applying different operational modes described below. The computer readable instructions may be encoded within memory 323. Memory 323 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage medium.

The controller 322 based on operating instructions (that include the operational mode instructions) stored in memory 323 and sensor inputs, described below, selectively modifies the shifting characteristics of the CVT. The memory 323 in an example includes the operating instructions (system) with the operational modes that are implemented by the controller 322.

Sensors 324-1 through 324-n provide sensor information to the controller 322. The sensor provided information includes, but is not limited to, accelerator pedal position, brake pedal position, wheel position (each of four wheels in a four-wheel vehicle), transmission shaft speed, axle shaft speed, prop shaft speed between transmission and front drive, engine crankshaft speed, acceleration information from accelerometers, orientation information from gyroscopes, location information from global positioning systems (GPS), radar information from radar, image information from vision systems, suspension load, transmission sump oil temp, transmission hydraulic pressures, steering angle, traction control, altimeter information from altimeters, and incline information from inclinometers. Other sensor information may include engine torque (control area network (CAN)), variator ratio, vehicle speed (CAN), PRNDL position (operation position), ignition status, primary clutch speed, secondary clutch speed, front drive disconnected and/or locked, and user interface inputs. Further, although the CVT clutch is described as being part of a CVT for a vehicle 300 with four wheels, CVT clutch 100 may be employed in any type of vehicle using a CVT.

Figure 12:
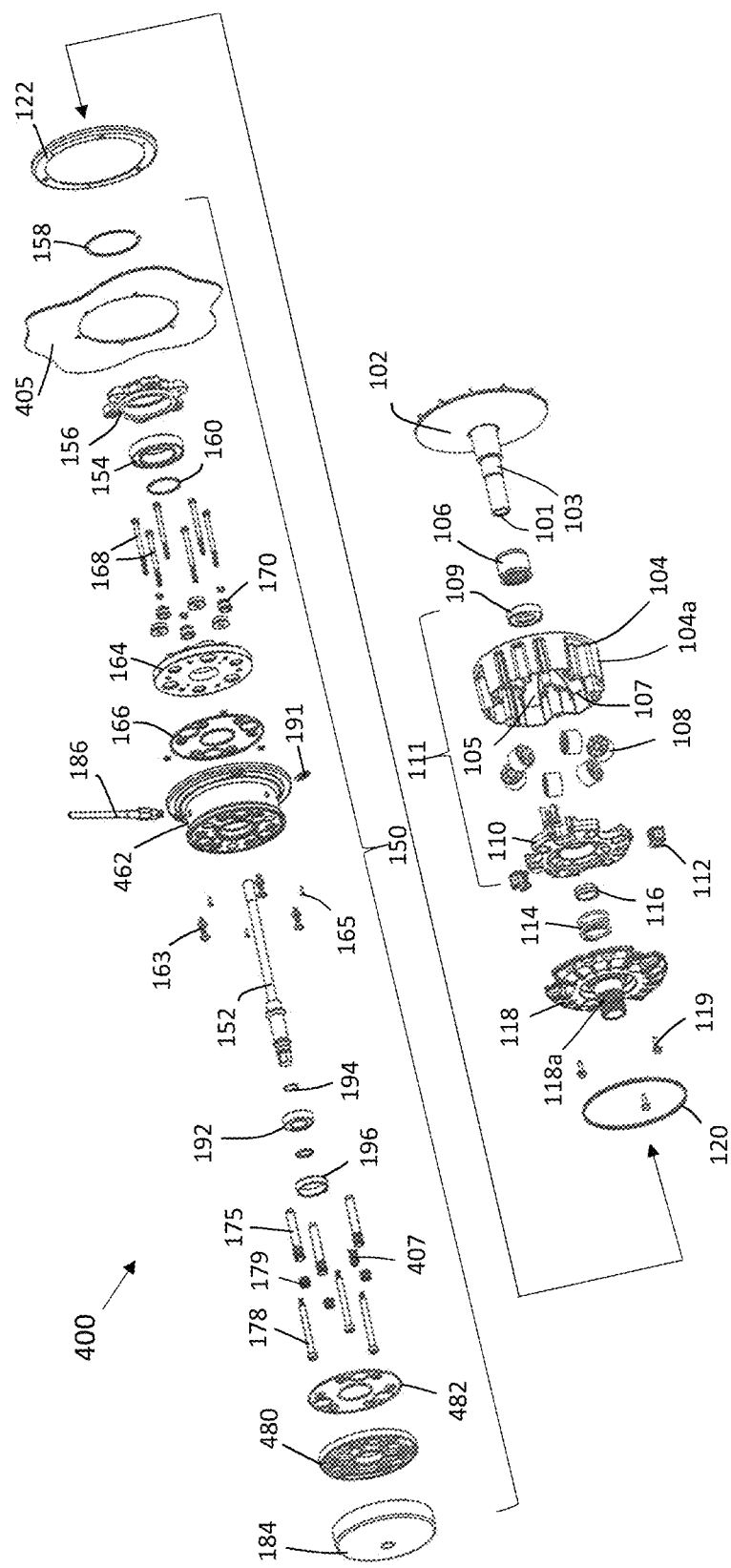
FIG. 12 is an unassembled side perspective view of another CVT clutch according to one exemplary embodiment.

Another example embodiment of a CVT is illustrated in the unassembled view of the CVT clutch 400 of FIG. 12 and the cross-sectional side perspective views of CVT clutch 400 in FIGS. 13A through 14B. In this example, slave pull pistons are not used. This reduces residual system drag and system cost by way of reduction in the number of the moving components that results in a more efficient, lighter, and more cost effective CVT clutch. CVT clutch 400 includes a fixed sheave 102 mounted on a first end of the post 103. And idler bearing 106 is mounted on the post 103 and is position between the fixed sheave 102 and the movable sheave 104. An idler bearing cap 109 engages the idler bearing 106.

The movable sheave 104 includes a hub portion 104a that forms an inner chamber 105. Within the inner chamber 105 is a reactive assembly 111 that is designed to axially move the movable sheave 104 based on at least one of RPM and torque that the CVT clutch 100 is experiencing. The reactive assembly 111 in this example includes a plurality of ramps 107, a spider 110 and a plurality of centrifugal pucks 108 or rollers. Ramps 107 are attached within the inner chamber 105 of the hub portion 104a of the movable sheave 104. In another embodiment the ramps 107 are formed in the inner chamber 105. Movable sheave 104 is slidably mounted on the post 103. The movable sheave 104 selectively moves axially on the post 103 towards and away from the fixed sheave 102 to position a belt at a desired distance from a central axis of the CVT clutch 100 to achieve a desired gearing.

Centrifugal pucks 108 or rollers are positioned to engage the ramps 107 within the hub portion 104a of the movable sheave 104. In one example the centrifugal pucks 108 or rollers 108 are designed to slide or roll along the ramps 107 due to centrifugal forces experienced by the CVT clutch 400. Spider 110, having torque buttons 112, also engages the centrifugal pucks 108 or rollers 108 in this example. The spider 110 is statically mounted on post 103. In one example, a jam nut 116 is used to axially retain the spider 110 on the post 103. The movable sheave 104 is biased away from the fixed sheave 102 by a clutch bias member 114 which is in this example a spring. Clutch bias member 114 is positioned between a movable sheave cover 118 and spider 110. The movable sheave cover 118 is coupled to an end of the hub portion 104a of the movable sheave 104 via fasteners 119 which in this example are screws. The movable sheave cover includes a central extending neck portion 118a that is received at least in part around an end portion of the post 103. In the example of FIG. 12, a clutch enclosure gasket 120 and an inner fastener mounting ring 122 may be used in the coupling. Movable sheave cover 118 and hub portion 104a of the movable sheave 104 form the inner chamber 105 in which the spider 110 and centrifugal pucks 108 or rollers are received.

Figure 13A:
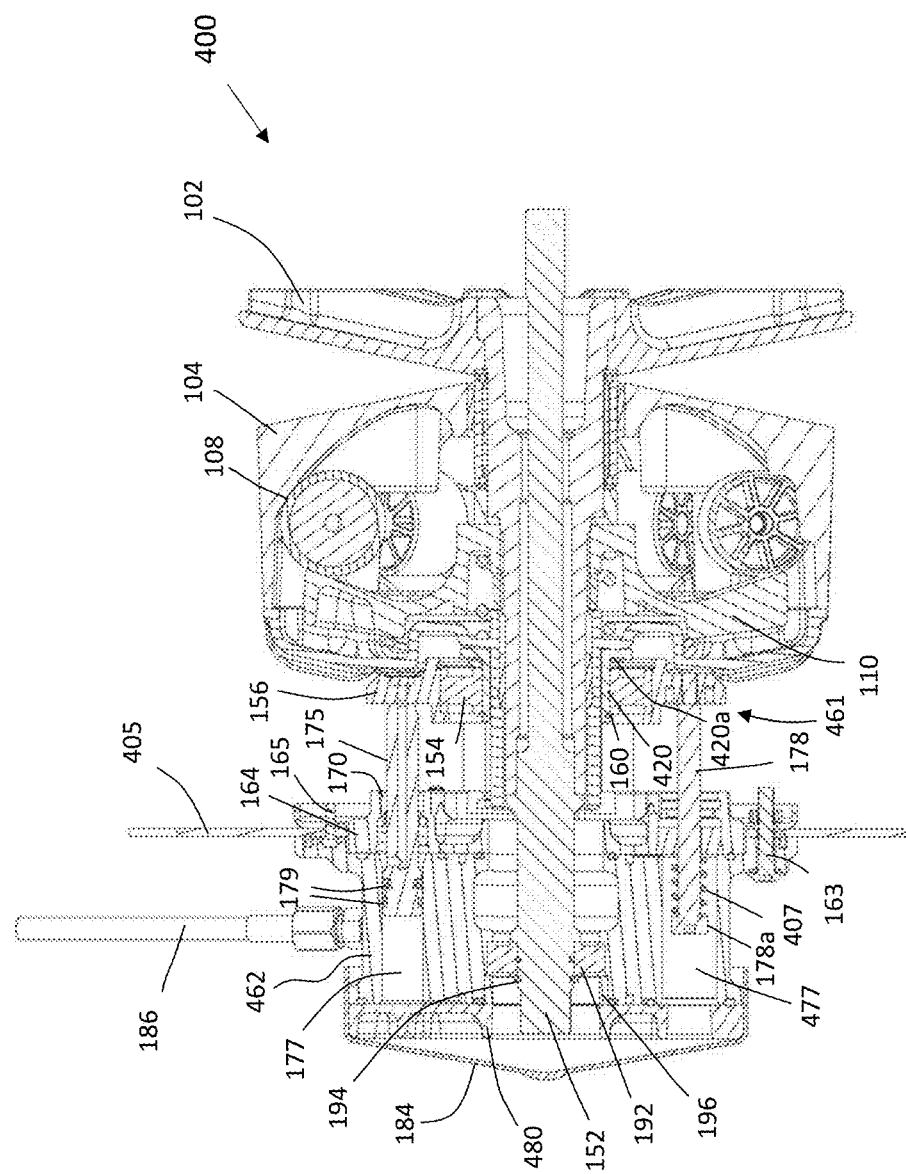
FIG. 13A is an assembled cross-sectional side view of the CVT clutch of FIG. 12 in a first configuration.

A CVT gearing control assembly 150 of the CVT clutch 400 includes an extended clutch bolt 152 that includes a first portion that is received within a central bore 101 of the post 103. CVT clutch 400 also includes an engaging member 461 that selectively engages the sheave cover 118 of the movable sheave 104 to move the movable sheave 104. The engaging member 461, as best illustrated in FIG. 13A, includes the inner bearing 154, the inner bearing housing 156, and a plain bearing 420 in this example. The plain bearing 420 is slidably mounted on the neck portion 118a of the cover 118 of the movable sheave 104. The inner bearing 154 is mounted on the plain bearing 420 and the inner bearing housing 156 is in turn mounted on the inner bearing 154 in this example. The inner bearing 154 is held in a static axial location on the plain bearing via retain clip 160 and a radially extending tab 420a of the plain bearing.

The CVT gearing control assembly 150 further includes a slave cylinder housing 462 that is coupled to an outer CVT enclosure 405, via fasteners 163. An inner slave cylinder cover 164 is coupled to the slave cylinder housing 462. Inner cover seals 166 are used to seal the inner slave cylinder cover 164 and passages through the inner slave cylinder cover 164 to an oil chamber formed by the slave cylinder housing 462 and the inner slave cylinder cover 164. Further illustrated are slave cylinder bolts 168 and inner cover seals 170. The slave cylinder housing 462 is positioned around a second portion of the extended clutch bolt 152.

Also included in the CVT gearing control assembly 150 is a plurality of slave push pistons 175 that are positioned within associated slave push piston cylinders 177 within the oil chamber formed by the slave cylinder housing 462 as best illustrated in FIG. 13A. The slave push pistons 175 are in operational communication with the engaging member 461 to selectively act to close the clutch sheaves (i.e., act to move the movable sheave 104 towards the fixed sheave 102). In this example, no slave pull pistons 172 are used. Instead, pull biasing members 407 are engaged with each return bolt 178 of the plurality of return bolts 178. Each pull piston is received in a pull cylinder 477. As illustrated, each pull biasing member 407, in this example, is mounted on an associated return bolt 178 that is positioned within an associated pull piston cylinder formed in the slave cylinder housing 462. Each pull biasing member 407 has a first end that engages a bolt head 178a of an associated return bolt 178. Each pull biasing member 407 further includes a second end that operationally engages the inner slave cylinder cover 164 to assert a biasing force that pulls the engaging member 461 away from the moveable sheave 104. This allows the reactive assembly 111 to set the gearing (spacing between the movable sheave 104 and fixed sheave 102).

Push piston seals 179 are used to seal each slave push piston 175 within an associated slave push piston cylinder 177. Each return bolt 178, in an example, is coupled to inner bearing housing 156. Further, in one example, each return bolt 178 is threadably engaged to the inner bearing housing 156.

The arrangement of the slave cylinder assembly, which includes the slave push pistons 175, return bolts 178, slave cylinder housing 462, etc., allow for the easy removal the slave cylinder assembly from the movable sheave 104 of the CVT clutch 100. In particular, removal of fasteners 163 and retaining clip 194 in this example, allows for the removal of the slave assembly from the movable sheave 104 (and CVT clutch 400) without a need to break into any of the hydraulic fluid passages of the master/slave pump system of the CVT clutch 400. This provides an in-field serviceable CVT clutch and belt system.

An outer slave cylinder cover 480 is coupled to the slave cylinder housing 462. A plurality of outer cover seals 482 are used to seal the outer slave cylinder cover 480 to the slave cylinder housing 462. A dust cover 184 is designed to cover the outer slave cylinder cover 480 to protect from external contamination and allow for air volume changes underneath cover 184 with associated movement of return bolts 178. Oil line 186 provides a fluid passage into and out of the slave cylinder housing 462. Oil bleed screw 191 may be used to bleed air out of the slave cylinder housing 462. Further illustrated are an outer bearing 192, the retaining clip 194 to axially hold the outer bearing 192 on the extended clutch bolt 152, and a bearing collar 196.

The use of the extended clutch bolt 152 allows forces generated by the slave cylinder assembly, that are applied to the movable sheave portion of the CVT clutch 400, to be reacted upon entirely within the CVT clutch 400. This ensures, in a drive clutch example of the CVT clutch 400, that these generated forces are not communicated to a crankshaft of an engine (such as motor 302 of FIG. 11). Any forces generated by either the CVT clutch 400 or the hydraulic system are self-contained in this example.

In embodiments the hydraulic circuit formed with the master/slave pump system in the actuator assembly in this example is used to provide the push force only since the return force is provided by the pull biasing members 407.

Figure 13B:
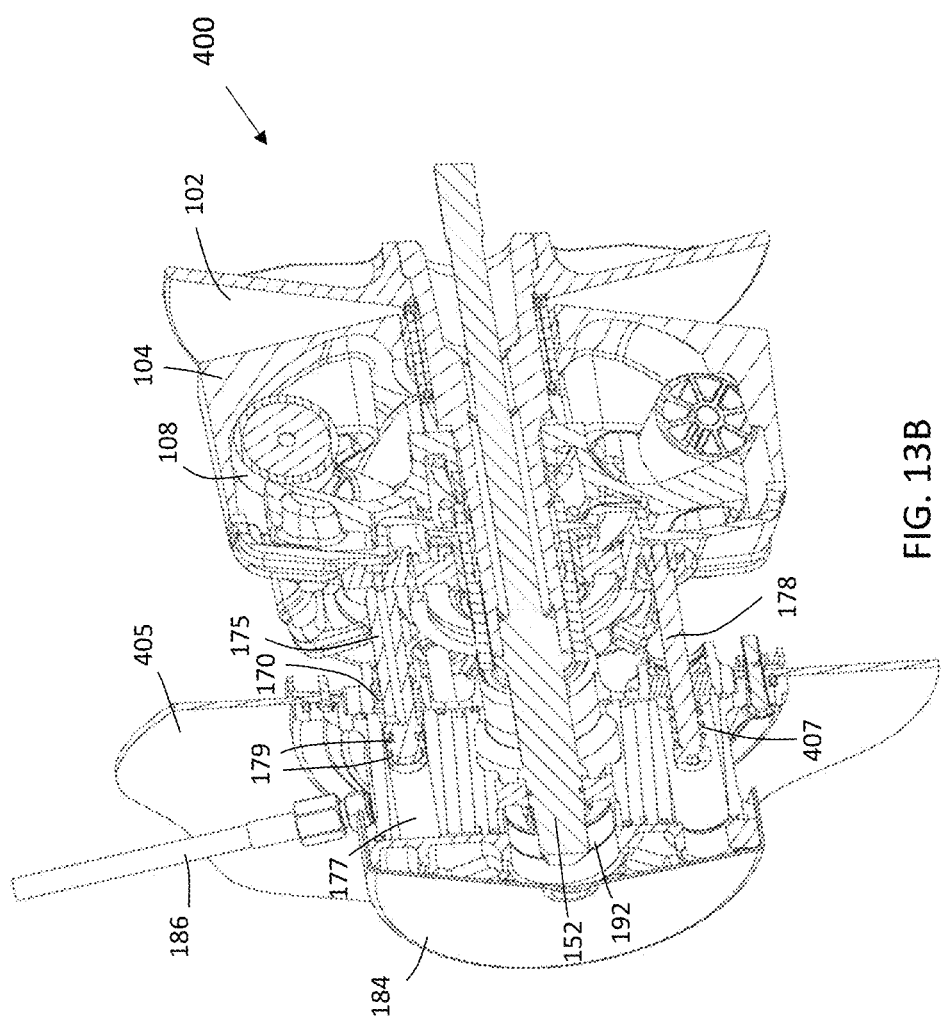
FIG. 13B is a side-perspective cross-sectional view of the CVT clutch of FIG. 12 in the first configuration.
Figure 14A:
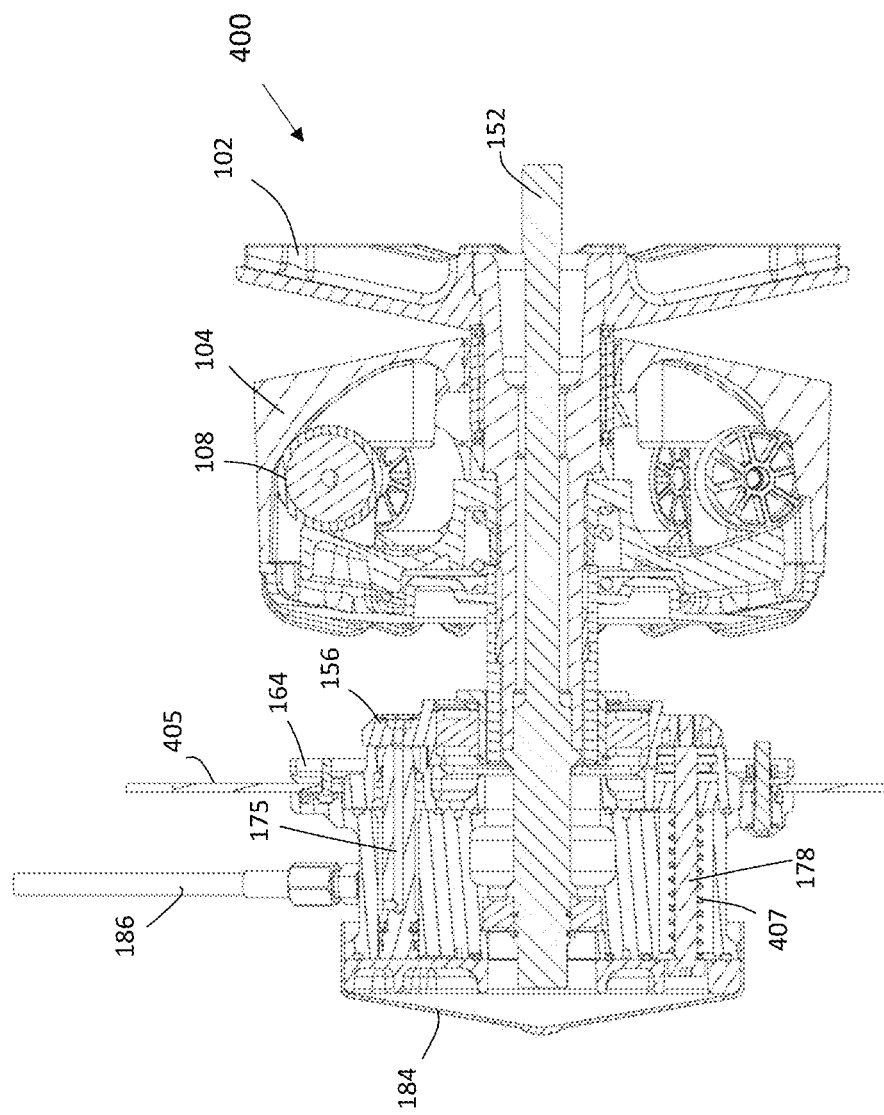
FIG. 14A is an assembled cross-sectional side view of the CVT clutch of FIG. 12 in a second configuration.
Figure 14B:
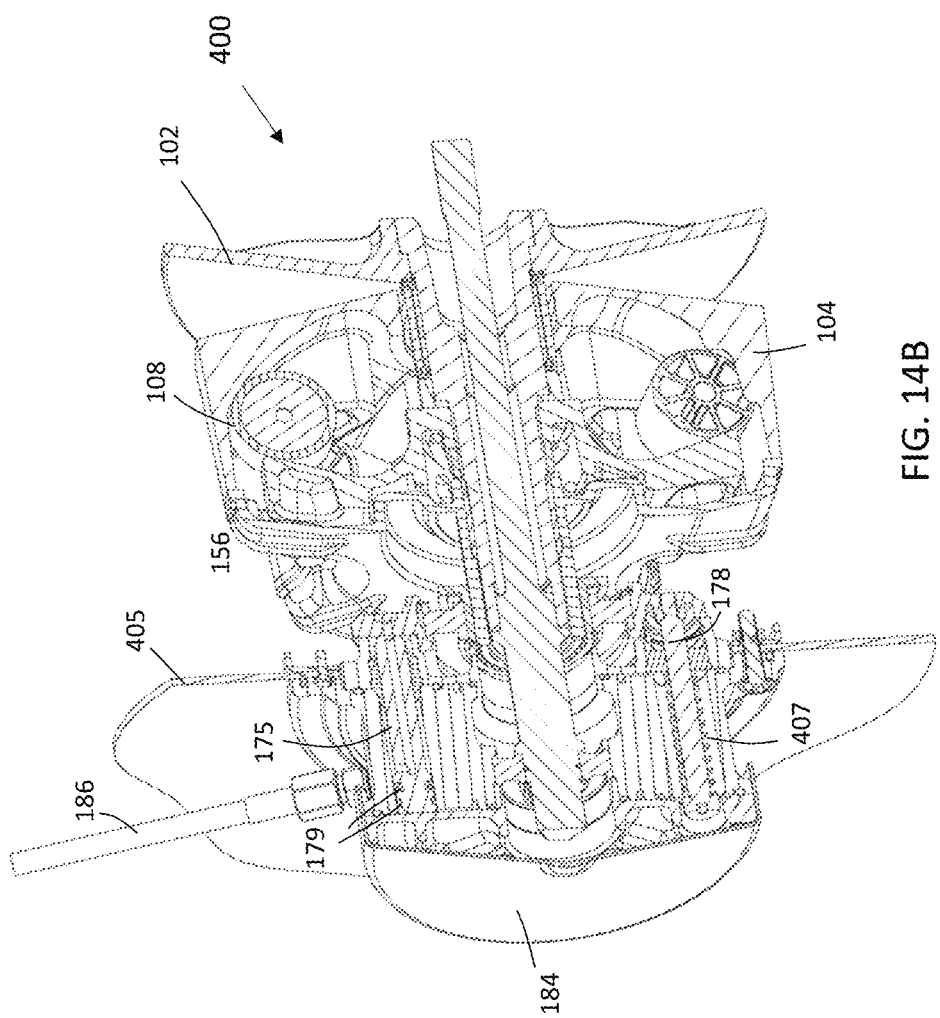
FIG. 14B is a side-perspective cross-sectional view of the CVT clutch of FIG. 12 in the second configuration.

FIGS. 13A and 13B illustrate the CVT clutch 400 in a configuration where hydraulic pressure through oil line 186 has pushed the slave push pistons 175 to move the movable sheave towards the fixed sheave 102, which may occur in situations where it is desired to override the normal operating characteristics of the CVT clutch 400. FIGS. 14A and 14B illustrate the CVT clutch 400 in a configuration where normal operating characteristics position the movable sheave 104 towards the fixed sheave 102 based on the amount of torque or RPM's the CVT clutch 400 is experiencing. In this configuration, the pull biasing members 407, due to the lack of hydraulic pressure, pull the slave push pistons 175 into the respective slave push piston cylinders 177 so the slave push pistons 175 do not engage the movable sheave 104.

Example Embodiments

Example 1 includes a CVT clutch is provided that includes a post, a fixed sheave, a movable sheave, a reactive assembly and a CVT gearing control assembly. The fixed sheave is mounted on a first end of the post in an axially fixed configuration. The movable sheave mounted on the post. The movable sheave is configured to selectively move axially on the post. The reactive assembly is configured to move the movable sheave based on at least one of RPMs the CVT clutch is experiencing and torque the CVT clutch is experiencing. The CVT gearing control assembly is configured to move the movable sheave axially on the post independent of movement caused by the reactive assembly. The CVT gearing control assembly includes an engaging member, a slave cylinder housing, at least one oil line, slave push pistons, and an actuator assembly. The slave cylinder housing forms an oil chamber that includes a plurality of slave push piston cylinders. The at least one oil line is in fluid communication with the oil chamber. A slave push piston is received in each slave push piston cylinder of the plurality of slave push piston cylinders in the slave cylinder housing. Each slave push piston is in operational communication with the engaging member. The actuator assembly includes an actuator that is configured to adjust pressure in the at least one oil line to selectively move the movable sheave axially on the post independent of movement caused by the reactive assembly.

Example 2 includes the CVT clutch of Example 1, further including at least one sensor that is configured to generate sensor signals, a memory that is configured to store operating instructions, and a controller that is configured to control the actuator of the actuator assembly based at least in part on the operating instructions and the sensor signals from the at least one sensor.

Example 3 includes the CVT clutch of any of the Examples 1-2, wherein the slave cylinder housing further includes a plurality of pull cylinders.

Example 4 includes the CVT clutch of Example 3, further including return bolts and pull biasing members. A return bolt is received in each pull cylinder of the slave cylinder housing. Each return bolt includes a first end having a head and a second end coupled to the engaging member. A pull biasing member is used for each return bolt. Each pull biasing member is configured to bias an associated return bolt into an associated pull cylinder.

Example 5 includes the CVT clutch of Example 4, further including an inner slave cylinder cover coupled to the slave cylinder housing to form at least in part the oil chamber. Each pull biasing member is positioned between the head of an associated return bolt and the inner slave cylinder cover.

Example 6 includes the CVT clutch of Example 3, further including a slave pull piston received in each pull cylinder of the plurality of pull cylinders in the slave cylinder housing. Each slave pull piston is in operational communication with the engaging member.

Example 7 includes the CVT clutch of Example 6, wherein the CVT gearing control assembly further includes a return bolt for each slave pull piston. Each return bolt is received within a central passage of an associate slave pull piston. Each return bolt coupled to the engaging member.

Example 8 includes the CVT clutch of any of the Examples 1-7, further includes an extended clutch bolt, a first portion of the extended clutch bolt received within a central bore of the post, the slave cylinder housing positioned around a second portion of the extended clutch bolt.

Example 9 includes the CVT clutch of any of the Examples 1-8, wherein the actuator assembly further includes a master cylinder housing and an actuator piston. The master cylinder housing includes a master piston cylinder. The at least one oil line is in fluid communication with the master piston cylinder. The actuator piston is received within the master piston cylinder. The actuator is in operational communication with the actuator piston. The actuator is controlled by the controller.

Example 10 includes the CVT clutch of any of the Examples 1-9, wherein the engaging member further includes an inner bearing housing, an inner bearing and plain bearing. The inner bearing housing is mounted on the inner bearing. The plain bearing is slidably mounted on a neck portion of a movable sheave cover of the moveable sheave. The inner bearing is mounted on the plain bearing.

Example 11 includes a CVT clutch is provided that includes a post, a fixed sheave, a movable sheave, a reactive member, a CVT gearing control assembly, and an actuator assembly. The fixed sheave is mounted on a first end of the post in an axially fixed configuration. The movable sheave is mounted on the post. The movable sheave is configured to selectively move axially on the post. The reactive assembly is configured to move the movable sheave based on at least one of RPMs the CVT clutch is experiencing and torque the CVT clutch is experiencing. The CVT gearing control assembly is configured to move the movable sheave axially on the post independent of movement caused by the reactive assembly. The CVT gearing control assembly includes an engaging member, a slave cylinder housing, at least one oil line, slave push pistons, return bolts, pull biasing members, and an actuator assembly. The slave cylinder housing forms an oil chamber that includes a plurality of slave push piston cylinders and a plurality of pull cylinders. The at least one oil line is in fluid communication with the oil chamber. A slave push piston is received in each slave push piston cylinder of the plurality of pull cylinders in the slave cylinder housing. Each slave push piston is in operational communication with the engaging member. A return bolt received in each pull cylinder of the slave cylinder housing. Each return bolt includes a first end having a head and a second end coupled to the engaging member. A pull biasing member is used for each return bolt. Each pull biasing member is configured to bias an associated return bolt into an associated pull cylinder. The actuator assembly includes an actuator that is configured to adjust pressure in the at least one oil line to selectively move the movable sheave axially on the post independent of a movement caused by the reactive assembly.

Example 12 includes the CVT clutch of Example 11, further including at least one sensor, a memory, and a controller. The at least one sensor is configured to generate sensor signals. The memory is configured to store operating instructions. The controller is configured to control the actuator of the actuator assembly based at least in part on the operating instructions and the sensor signals from the at least one sensor.

Example 13 includes the CVT clutch of any of the Examples 11-12, wherein the engaging member further includes a inner bearing housing, an inner bearing and a plain bearing. The inner bearing housing is mounted on the inner bearing. The plain bearing is slidably mounted on a neck portion of a movable sheave cover of the moveable sheave, the inner bearing mounted on the plain bearing.

Example 14 includes the CVT clutch of any of the Examples 11-13, further including an inner slave cylinder cover coupled to the slave cylinder housing to form at least in part the oil chamber. Each pull biasing member is positioned between a head of an associated return bolt and the inner slave cylinder cover.

Example 15 includes a vehicle including a motor, a CVT, at least one sensor, at least one controller, at least one memory and a driveline. The motor is used to generate torque. The CVT including a drive clutch and driven clutch in torsional communication with each other through an endless looped member, the drive clutch in torsional communication with the motor, the drive clutch including, a post, a fixed sheave, a movable sheave, a reactive assembly, a CVT gearing control assembly. The fixed sheave is mounted on a first end of the post in an axially fixed configuration. The movable sheave is mounted on the post. The movable sheave is configured to selectively move axially on the post. The reactive assembly is configured to move the movable sheave based on at least one of a RPMs the drive clutch is experiencing and torque the drive clutch is experiencing. The CVT gearing control assembly is configured to move the movable sheave axially on the post independent of movement caused by the reactive assembly. The CVT gearing control assembly includes an engaging member, a slave cylinder housing, at least one oil line, a slave push piston, and an actuator assembly. The slave cylinder housing forms an oil chamber that includes a plurality of slave push piston cylinders. The at least one oil line is in fluid communication with the oil chamber. A slave push piston received in each slave push piston cylinder of the plurality of slave push piston cylinders in the slave cylinder housing. Each slave push piston is in operational communication with the engaging member. The actuator assembly includes an actuator that is configured to adjust pressure in the at least one oil line to selectively move the movable sheave axially on the post independent of a movement caused by the reactive assembly. The at least one sensor is configured to generate sensor signals. The memory is configured to store operating instructions. The controller is configured to control the actuator of the actuator assembly based at least in part on the operating instructions and the sensor signals from the at least one sensor. The driveline is in torsional communication with the driven clutch.

Example 16 includes the vehicle of Example 15, wherein the slave cylinder housing further includes a plurality of pull cylinders.

Example 17, includes the vehicle of Example 16, further including a return bolt received in each pull cylinder of the slave cylinder housing a pull biasing members. Each return bolt includes a first end having a head and a second end coupled to the engaging member. A pull biasing member is used for each return bolt. Each pull biasing member is configured to bias an associated return bolt into an associated pull cylinder.

Example 18 includes the vehicle any of the Examples 15-17, wherein the engaging member further includes a inner bearing housing, an inner bearing and a plain bearing. The inner bearing housing is mounted on the inner bearing. The plain bearing is slidably mounted on a neck portion of a movable sheave cover of the movable sheave. The inner bearing is mounted on the plain bearing.

Example 19 includes the vehicle of any of the Examples 15-18 wherein the actuator assembly further includes a master cylinder housing, an actuator piston and an actuator. The master cylinder housing includes a master piston cylinder. The at least one oil line is in fluid communication with the master piston cylinder. The actuator piston is received within the master piston cylinder. The actuator is in operational communication with the actuator piston. The actuator is controlled by the controller.

Example 20 includes the vehicle of any of Examples 15, further including slave pull pistons and return bolts. A slave pull piston is received in each pull cylinder of a plurality of pull cylinders formed in the slave cylinder housing. A return bolt is used for each slave pull piston. Each return bolt is received within a central passage of an associate slave pull piston. Each return bolt coupled to the engaging member.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuously variable transmission (CVT) clutch, the CVT clutch comprising:
   a post,
   a fixed sheave mounted on a first end of the post in an axially fixed configuration;
   a movable sheave mounted on the post, the movable sheave configured to selectively move axially on the post;
   a reactive assembly configured to move the movable sheave based on at least one of a revolutions per minute (RPM) the CVT clutch is experiencing and torque the CVT clutch is experiencing;
   a CVT gearing control assembly configured to move the movable sheave axially on the post independent of movement caused by the reactive assembly, the CVT gearing control assembly including,
   an engaging member,
   a slave cylinder housing forming an oil chamber that includes a plurality of slave push piston cylinders,
   at least one oil line in fluid communication with the oil chamber, and
   a slave push piston received in each slave push piston cylinder of the plurality of slave push piston cylinders in the slave cylinder housing, each slave push piston in operational communication with the engaging member, and
   an actuator assembly including an actuator that is configured to adjust pressure in the at least one oil line to selectively move the movable sheave axially on the post independent of movement caused by the reactive assembly.

2. The CVT clutch of claim 1, further comprising:
   at least one sensor configured to generate sensor signals;
   a memory configured to store operating instructions; and
   a controller configured to control the actuator of the actuator assembly based at least in part on the operating instructions and the sensor signals from the at least one sensor.

3. The CVT clutch of claim 1, wherein the slave cylinder housing further includes a plurality of pull cylinders.

4. The CVT clutch of claim 3, further comprising:
   a return bolt received in each pull cylinder of the slave cylinder housing, each return bolt including a first end having a head and a second end coupled to the engaging member; and
   a pull biasing member for each return bolt, each pull biasing member configured to bias an associated return bolt into an associated pull cylinder.

5. The CVT clutch of claim 4, further comprising:
   an inner slave cylinder cover coupled to the slave cylinder housing to form at least in part the oil chamber, each pull biasing member positioned between the head of an associated return bolt and the inner slave cylinder cover.

6. The CVT clutch of claim 3, further comprising:
   a slave pull piston received in each pull cylinder of the plurality of pull cylinders in the slave cylinder housing, each slave pull piston in operational communication with the engaging member.

7. The CVT clutch of claim 6, wherein the CVT gearing control assembly further comprises:
   a return bolt for each slave pull piston, each return bolt received within a central passage of an associate slave pull piston, each return bolt coupled to the engaging member.

8. The CVT clutch of claim 1, further comprising:
   an extended clutch bolt, a first portion of the extended clutch bolt received within a central bore of the post, the slave cylinder housing positioned around a second portion of the extended clutch bolt.

9. The CVT clutch of claim 1, wherein the actuator assembly further comprises:
   a master cylinder housing including a master piston cylinder, the at least one oil line in fluid communication with the master piston cylinder;
   an actuator piston received within the master piston cylinder; and
   an actuator in operational communication with the actuator piston, the actuator controlled by the controller.

10. The CVT clutch of claim 1, wherein the engaging member further comprises:
    an inner bearing housing; and
    an inner bearing, the inner bearing housing mounted on the inner bearing; and
    a plain bearing slidably mounted on a neck portion of a movable sheave cover of the movable sheave, the inner bearing mounted on the plain bearing.

11. A continuously variable transmission (CVT) clutch, the CVT clutch comprising:
    a post,
    a fixed sheave mounted on a first end of the post in an axially fixed configuration;
    a movable sheave mounted on the post, the movable sheave configured to selectively move axially on the post;
    a reactive assembly configured to move the movable sheave based on at least one of a revolutions per minute (RPM) the CVT clutch is experiencing and torque the CVT clutch is experiencing;
    a CVT gearing control assembly configured to move the movable sheave axially on the post independent of movement caused by the reactive assembly, the CVT gearing control assembly including,
    an engaging member,
    a slave cylinder housing forming an oil chamber that includes a plurality of slave push piston cylinders and a plurality of pull cylinders,
    at least one oil line in fluid communication with the oil chamber,
    a slave push piston received in each slave push piston cylinder of the plurality of pull cylinders in the slave cylinder housing, each slave push piston in operational communication with the engaging member,
    a return bolt received in each pull cylinder of the slave cylinder housing, each return bolt including a first end having a head and a second end coupled to the engaging member,
    a pull biasing member for each return bolt, each pull biasing member configured to bias an associated return bolt into an associated pull cylinder, and
    an actuator assembly including an actuator that is configured to adjust pressure in the at least one oil line to selectively move the movable sheave axially on the post independent of a movement caused by the reactive assembly.

12. The CVT clutch of claim 11, further comprising;
at least one sensor configured to generate sensor signals;
a memory configured to store operating instructions; and
a controller configured to control the actuator of the actuator assembly based at least in part on the operating instructions and the sensor signals from the at least one sensor.

13. The CVT clutch of claim 11, wherein the engaging member further comprises:
an inner bearing housing; and
an inner bearing, the inner bearing housing mounted on the inner bearing; and
a plain bearing slidably mounted on a neck portion of a movable sheave cover of the movable sheave, the inner bearing mounted on the plain bearing.

14. The CVT clutch of claim 11, further comprising:
an inner slave cylinder cover coupled to the slave cylinder housing to form at least in part the oil chamber, each pull biasing member positioned between a head of an associated return bolt and the inner slave cylinder cover.

15. A vehicle comprising:
a motor to generate torque;
a continuously variable transmission (CVT), the CVT including a drive clutch and driven clutch in torsional communication with each other through an endless looped member, the drive clutch in torsional communication with the motor, the drive clutch including,
a post,
a fixed sheave mounted on a first end of the post in an axially fixed configuration;
a movable sheave mounted on the post, the movable sheave configured to selectively move axially on the post;
a reactive assembly configured to move the movable sheave based on at least one of a revolutions per minute (RPM) the drive clutch is experiencing and torque the drive clutch is experiencing;
a CVT gearing control assembly configured to move the movable sheave axially on the post independent of movement caused by the reactive assembly, the CVT gearing control assembly including,
an engaging member,
a slave cylinder housing forming an oil chamber that includes a plurality of slave push piston cylinders,
at least one oil line in fluid communication with the oil chamber, and
a slave push piston received in each slave push piston cylinder of the plurality of slave push piston cylinders in the slave cylinder housing, each slave push piston in operational communication with the engaging member, and
an actuator assembly including an actuator that is configured to adjust pressure in the at least one oil line to selectively move the movable sheave axially on the post independent of a movement caused by the reactive assembly
at least one sensor configured to generate sensor signals;
a memory configured to store operating instructions;
a controller configured to control the actuator of the actuator assembly based at least in part on the operating instructions and the sensor signals from the at least one sensor; and
a driveline in torsional communication with the driven clutch.

16. The vehicle of claim 15, wherein the slave cylinder housing further includes a plurality of pull cylinders.

17. The vehicle of claim 16, further comprising:
a return bolt received in each pull cylinder of the slave cylinder housing, each return bolt including a first end having a head and a second end coupled to the engaging member; and
a pull biasing member for each return bolt, each pull biasing member configured to bias an associated return bolt into an associated pull cylinder.

18. The vehicle of claim 15, wherein the engaging member further comprises:
an inner bearing housing; and
an inner bearing, the inner bearing housing mounted on the inner bearing; and
a plain bearing slidably mounted on a neck portion of a movable sheave cover of the movable sheave, the inner bearing mounted on the plain bearing.

19. The vehicle of claim 15, wherein the actuator assembly further comprises:
a master cylinder housing including a master piston cylinder, the at least one oil line in fluid communication with the master piston cylinder;
an actuator piston received within the master piston cylinder; and
an actuator in operational communication with the actuator piston, the actuator controlled by the controller.

20. The vehicle of claim 15, further comprising:
a slave pull piston received in each pull cylinder of a plurality of pull cylinders formed in the slave cylinder housing; and
a return bolt for each slave pull piston, each return bolt received within a central passage of an associate slave pull piston, each return bolt coupled to the engaging member.

* * * * *